US010803358B2

(12) United States Patent
Abe et al.

(10) Patent No.: US 10,803,358 B2
(45) Date of Patent: Oct. 13, 2020

(54) INFORMATION PROCESSING DEVICE, INFORMATION PROCESSING METHOD, AND RECORDING MEDIUM

(71) Applicant: NEC Corporation, Minato-ku, Tokyo (JP)

(72) Inventors: Noriyuki Abe, Tokyo (JP); Takashi Onishi, Tokyo (JP); Shohei Higashiyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 85 days.

(21) Appl. No.: 16/075,722

(22) PCT Filed: Feb. 8, 2017

(86) PCT No.: PCT/JP2017/004504
§ 371 (c)(1),
(2) Date: Aug. 6, 2018

(87) PCT Pub. No.: WO2017/138549
PCT Pub. Date: Aug. 17, 2017

(65) Prior Publication Data
US 2019/0042890 A1  Feb. 7, 2019

(30) Foreign Application Priority Data

Feb. 12, 2016  (JP) .................... 2016-025150

(51) Int. Cl.
*G06K 9/62* (2006.01)
*G06F 16/35* (2019.01)

(52) U.S. Cl.
CPC .......... *G06K 9/6262* (2013.01); *G06F 16/35* (2019.01); *G06F 16/353* (2019.01);
(Continued)

(58) Field of Classification Search
CPC .. G06K 9/6262; G06K 9/6215; G06K 9/6255; G06K 9/6265; G06F 16/00;
(Continued)

(56) References Cited

U.S. PATENT DOCUMENTS 7,499,923 B2   3/2009 Kawatani
2004/0230577 A1* 11/2004 Kawatani ............. G06K 9/6218
(Continued)

FOREIGN PATENT DOCUMENTS

JP   2000-222431 A   8/2000
JP   2004-288168 A   10/2004
(Continued)

OTHER PUBLICATIONS

Patrick Pantel et al., "Espresso: Leveraging Generic Patterns for Automatically Harvesting Semantic Relations", Proceedings of 21st International Conference on Computational Linguistics and 44th Annual Meeting of the Association for Computational Linguistics, pp. 113-120, Jul. 17-18, 2006 (8 pages total).
(Continued)

*Primary Examiner* — Jaime M Holliday

(57) ABSTRACT

An information processing device according to the present invention includes: a memory; and at least one processor coupled to the memory, the processor performing operations, the operations comprising: providing, based on a first reliability score being a value representing a degree of a relationship between an instance candidate being a candidate for an instance that is data included in a category being a set of predetermined data and a pattern being a characteristic expression in the predetermined data, a first label for at least a part of the instance candidates; and updating the first reliability score of the instance candidate provided with the first label.

9 Claims, 20 Drawing Sheets

SEED INSTANCE

UPDATED→ INSTANCE I₁: PASTA
RELIABILITY SCORE r(I₁)=0.400

UPDATED→ INSTANCE I₂: FISH
RELIABILITY SCORE r(I₂)=0.514

PATTERN CANDIDATE

PATTERN CANDIDATE P₁: EAT X
RELIABILITY SCORE r(P₁)=0.800

PATTERN CANDIDATE P₂: GO TO X STORE
RELIABILITY SCORE r(P₂)=0.633

(52) U.S. Cl.
CPC ......... *G06F 16/355* (2019.01); *G06K 9/6215* (2013.01); *G06K 9/6255* (2013.01); *G06K 9/6265* (2013.01)

(58) Field of Classification Search
CPC ...... G06F 16/35; G06F 16/353; G06F 16/355; G06F 17/30707; G06F 17/3071
See application file for complete search history.

(56) References Cited

U.S. PATENT DOCUMENTS

| | | | |
|---|---|---|---|
| 2005/0097436 A1 | 5/2005 | Kawatani | |
| 2008/0147575 A1* | 6/2008 | Roy | G06F 16/35 706/12 |
| 2015/0199427 A1* | 7/2015 | Miyabe | G06F 16/35 707/739 |

FOREIGN PATENT DOCUMENTS

| | | |
|---|---|---|
| JP | 2005-158010 A | 6/2005 |
| JP | 2006-338263 A | 12/2006 |
| JP | 2011-154469 A | 8/2011 |

OTHER PUBLICATIONS

Vishnu Vyas et al., "Semi-Automatic Entity Set Refinement", 2009 Proceedings of Human Language Technologies: The 2009 Annual Conference of the North American Chapter of the Association for Computational Linguistics, pp. 290-298, May 31-Jun. 5, 2009 (9 pages total).
International Search Report dated May 9, 2017 issued by the International Searching Authority in No. PCT/JP2017/004504.
Written Opinion dated May 9, 2017 issued by the International Bureau in No. PCT/JP2017/004504.

\* cited by examiner

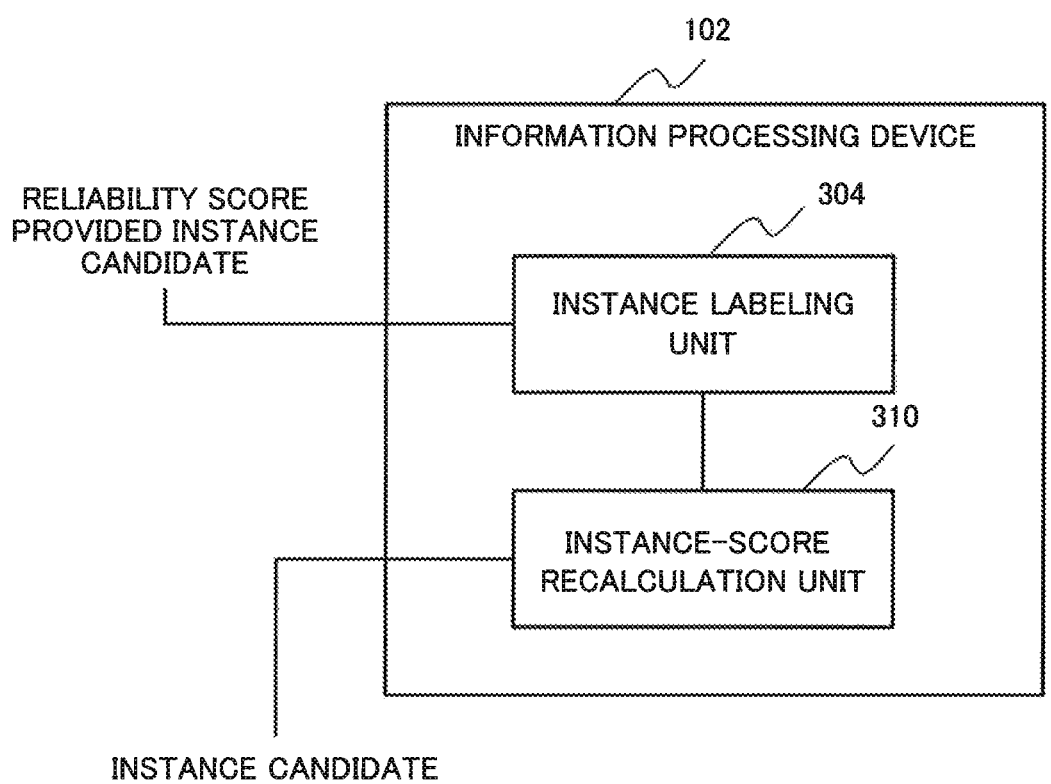

INFORMATION PROCESSING DEVICE, INFORMATION PROCESSING METHOD, AND RECORDING MEDIUM

This application is a National Stage Entry of PCT/JP2017/004504 filed on Feb. 8, 2017, which claims priority from Japanese Patent Application 2016-025150 filed on Feb. 12, 2016, the contents of all of which are incorporated herein by reference, in their entirety.

TECHNICAL FIELD

The present invention relates to processing of information (data), and in particular to an information processing device, an information processing method, and a recording medium that select information (data).

BACKGROUND ART

Recently, a technique for acquiring (selecting or extracting) knowledge from large-scale data (e.g. document data) has been studied. Herein, "knowledge" refers to data necessary for executing a predetermined operation or determination (task).

Further, a technique for acquiring (selecting or extracting) knowledge (data) that is an element of a set of previously determined knowledge (data) among pieces of knowledge (selected data) has been studied.

A set of previously determined knowledge (data) is referred to as a "category". Further, an element (knowledge, i.e. data) included in a category is referred to as an "instance". A device that acquires (extracts) an instance included in a category from a set of pieces of data is referred to as a category-knowledge acquisition device (see, for example, NPL 1).

Hereinafter, with reference to the drawings, a configuration and an operation of a common category-knowledge acquisition device described in NPL 1 and the like will be described.

FIG. 18 is a block diagram illustrating one example of a configuration of a common category-knowledge acquisition device 900. As illustrated in FIG. 18, the category-knowledge acquisition device 900 includes a pattern extraction unit 920 and an instance extraction unit 930.

The category-knowledge acquisition device 900 operates, for example, as described below. Note that, in the following description, the category-knowledge acquisition device 900 uses a bootstrapping method as an acquisition method of category knowledge. Further, the category-knowledge acquisition device 900 previously stores document data being a target for processing. Further, the category-knowledge acquisition device 900 previously stores a category being a target.

The category-knowledge acquisition device 900 firstly acquires a predetermined number of instances included in a category. The instance being first acquired (selected or received) is hereinafter referred to as a "seed instance". The category-knowledge acquisition device 900 may receive, for example, a seed instance from a device that is not illustrated. Alternatively, the category-knowledge acquisition device 900 may extract, as a seed instance, an instance from a category in accordance with a predetermined rule.

Then, the category-knowledge acquisition device 900 repeats operations in the pattern extraction unit 920 and the instance extraction unit 930 to be described below and extracts a set of instances.

Therefore, as illustrated in FIG. 18, the pattern extraction unit 920 includes a pattern-candidate extraction unit 922, a pattern-score calculation unit 923, and a pattern selection unit 926. Further, the instance extraction unit 930 includes an instance-candidate extraction unit 932, an instance-score calculation unit 933, and an instance selection unit 936.

The pattern-candidate extraction unit 922 extracts, from document data, a candidate for a "pattern" relating to (co-occurring with) a received instance (in the present case, a seed instance). Herein, the "pattern" refers to a context including an instance. Further, the "context" refers to a data portion that is a characteristic expression in document data (an expression relating to a syntax structure appearing many times in document data). A pattern extracted herein is hereinafter referred to also as a "pattern candidate".

The pattern-score calculation unit 923 provides a reliability score for the extracted pattern candidate. Herein, the "reliability score" refers to a value representing a degree (reliable degree) in which each pattern candidate relates to (co-occurs with) an instance. A pattern candidate having a high reliable degree is provided with a high reliability score. In contrast, a pattern candidate having a low reliable degree is provided with a low reliability score.

In other words, a pattern candidate having a large value of a reliability score is a pattern candidate that is more reliable (i.e. highly possible to relate to (co-occur with) an instance) than a pattern candidate having a low value of a reliability score.

Note that a reliability score is not specifically limited. One example of a reliability score is pointwise mutual information (PMI) between an instance and a pattern candidate.

The pattern selection unit 926 selects, as a pattern, a predetermined number of pattern candidates from a top reliability score.

The instance-candidate extraction unit 932 extracts, based on document data, a candidate for an instance relating to (co-occurring with) the selected pattern.

The instance-score calculation unit 933 provides a reliability score for the instance candidate extracted in the instance-candidate extraction unit 932. This reliability score may be a reliability score similar to the above-described reliability score in the pattern-score calculation unit 923.

The instance selection unit 936 selects, as an instance, a predetermined number of instance candidates from a top reliability score.

The instance extraction unit 930 transmits an extracted instance to the pattern extraction unit 920.

The pattern extraction unit 920 executes a similar operation by using an instance received from the instance extraction unit 930 instead of a seed instance. Then, the pattern extraction unit 920 transmits a selected pattern to the instance extraction unit 930.

The instance extraction unit 930 executes an operation similar to the above operation.

The category-knowledge acquisition device 900 repeats operations of the pattern extraction unit 920 and the instance extraction unit 930 until extracting a predetermined number of instances. In other words, the category-knowledge acquisition device 900 repeats the above-described operations and acquires (extracts) an instance included in a category from document data.

However, the category-knowledge acquisition device 900 using a bootstrapping method may extract, as an instance, data that are not included in a category while repeating the above-described operations of the pattern extraction unit 920 and the instance extraction unit 930. In this manner, the technique described in NPL 1 has an issue that inappropriate data is extracted (acquired) as an instance. This issue is referred to as "semantic drift".

Therefore, a technique for reducing semantic drift that is the issue in NPL 1 has been proposed (see, for example, NPL 2).

FIG. 19 is a block diagram illustrating one example of a configuration of a category-knowledge acquisition device 901 that copes with common semantic drift. As illustrated in FIG. 19, the category-knowledge acquisition device 901 includes the pattern extraction unit 920 and an instance extraction unit 931. The pattern extraction unit 920 is the same as in FIG. 18 described above, and therefore detailed description will be omitted.

The instance extraction unit 931 includes, in addition to the configuration included in the instance extraction unit 930, a check-target-instance selection unit 934, a negative-example check unit 935, an instance deletion unit 937, and an instance-score recalculation unit 938. The instance-candidate extraction unit 932, the instance-score calculation unit 933, and the instance selection unit 936 are the same as in FIG. 18 described above, and therefore detailed description will be omitted.

The check-target-instance selection unit 934 selects an instance candidate being a target for operations described below. For more detail, the check-target-instance selection unit 934 selects an instance candidate to be determined whether or not to be included in a category. The check-target-instance selection unit 934 selects, for example, an instance candidate in which a reliability score is included in a range of a predetermined order from a top reliability score.

The negative-example check unit 935 provides, for a selected instance candidate, a label (a positive label or a negative label) indicating whether or not to be included in (belong to) a category. The "positive label" is a label indicating that an instance candidate is included in (belongs to) a category. Further, the "negative label" is a label indicating that an instance candidate is not included in (does not belong to) a category. In other words, the negative-example check unit 935 provides a positive label for an instance candidate when the instance candidate is included in a category and provides a negative label for an instance candidate when the instance candidate is not included in a category.

Next, the instance deletion unit 937 deletes an instance candidate provided with a negative label and a pattern relating to (co-occurring with) the instance candidate.

Then, the instance-score recalculation unit 938 recalculates a reliability score of a remaining instance candidate.

The instance selection unit 936 selects, as an instance, an instance candidate, based on a recalculated reliability score.

In this manner, the category-knowledge acquisition device 901 that copes with semantic drift provides a negative label for the instance candidate by using the technique described in NPL 2 and the like when an instance candidate does not belong to a category (is not an appropriate instance). Then, the category-knowledge acquisition device 901 deletes an instance candidate provided with a negative label and a pattern relating to (co-occurring with) the instance candidate. In other words, the category-knowledge acquisition device 901 deletes an instance candidate that is not included in a category, by using a label.

The category-knowledge acquisition device 901 copes with semantic drift, based on the above-described operations. In other words, the category-knowledge acquisition device 901 extracts (acquires) a more appropriate instance, based on the above-described operations. As a result, the category-knowledge acquisition device 901 increases a ratio (concordance rate) of selecting an instance included in a category.

CITATION LIST

Non Patent Literature

[NPL 1] Patric Pantel, Marco Pannacchiotti, "Espresso: Leveraging Generic Patterns for Automatically Harvesting Semantic Relations", Proceedings of 21st International Conference on Computational Linguistics and 44th Annual Meeting of the Association for Computational Linguistics, pp 113-120, Jul. 17-18, 2006
[NPL 2] Vishnu Vyas and Patrick Pantel, "Semi-Automatic Entity Set Refinement", '09 Proceedings of Human Language Technologies: The 2009 Annual Conference of the North American Chapter of the Association for Computational Linguistics, pp. 290-298, May 31-Jun. 5, 2009

SUMMARY OF INVENTION

Technical Problem

However, it is difficult for the category-knowledge acquisition device 901 to reflect a label (a positive label and a negative label) that is information on whether or not an instance candidate is included in a category, in a reliability score of the instance candidate.

A reliability score of an instance candidate is a value being used when the instance extraction unit 931 selects an instance candidate as an instance. Therefore, the reliability score is preferably a value in which a label (a positive label and a negative label) that is information on whether or not to be included in a category is considered.

However, it is difficult for the category-knowledge acquisition device 901 to associate information relating to a label (a positive label and a negative label) with a value of a reliability score of an instance candidate.

In other words, in NPT 2, there is an issue that it is difficult to appropriately set a reliability score for an instance candidate. As a result, in NPL 2, there is an issue that it is difficult to appropriately extract (select) an instance.

An object of the present invention is to provide an information processing device, an information processing method, and a recording medium that solve the above-described issue and appropriately select (extract) an instance.

Solution to Problem

An information processing device according to one aspect of the present invention includes: a memory; and at least one processor coupled to the memory, the processor performing operations. The operations includes: providing, based on a first reliability score being a value representing a degree of a relationship between an instance candidate being a candidate for an instance that is data included in a category being a set of predetermined data and a pattern being a characteristic expression in the predetermined data, a first label for at least a part of the instance candidates; and updating the first reliability score of the instance candidate provided with the first label.

An information processing method according to one aspect of the present invention includes: providing, based on a first reliability score being a value representing a degree of a relationship between an instance candidate being a candidate for an instance that is data included in a category being a set of predetermined data and a pattern being a characteristic expression in the predetermined data, a first label for at least a part of the instance candidates; and updating the first reliability score of the instance candidate provided with the first label.

A non-transitory computer-readably recording medium according one aspect of the present invention embodies a program. The program causes a computer to perform a method. The method includes: providing, based on a first reliability score being a value representing a degree of a relationship between an instance candidate being a candidate for an instance that is data included in a category being a set of predetermined data and a pattern being a characteristic expression in the predetermined data, a first label for at least a part of the instance candidates; and updating the first reliability score of the instance candidate provided with the first label.

Advantageous Effects of Invention

According to the present invention, an advantageous effect of appropriately selecting an instance can be achieved.

BRIEF DESCRIPTION OF DRAWINGS

FIG. 20 is a block diagram illustrating one example of a configuration of a first modified example of the information processing device according to the first example embodiment.

EXAMPLE EMBODIMENT

Figure 1:
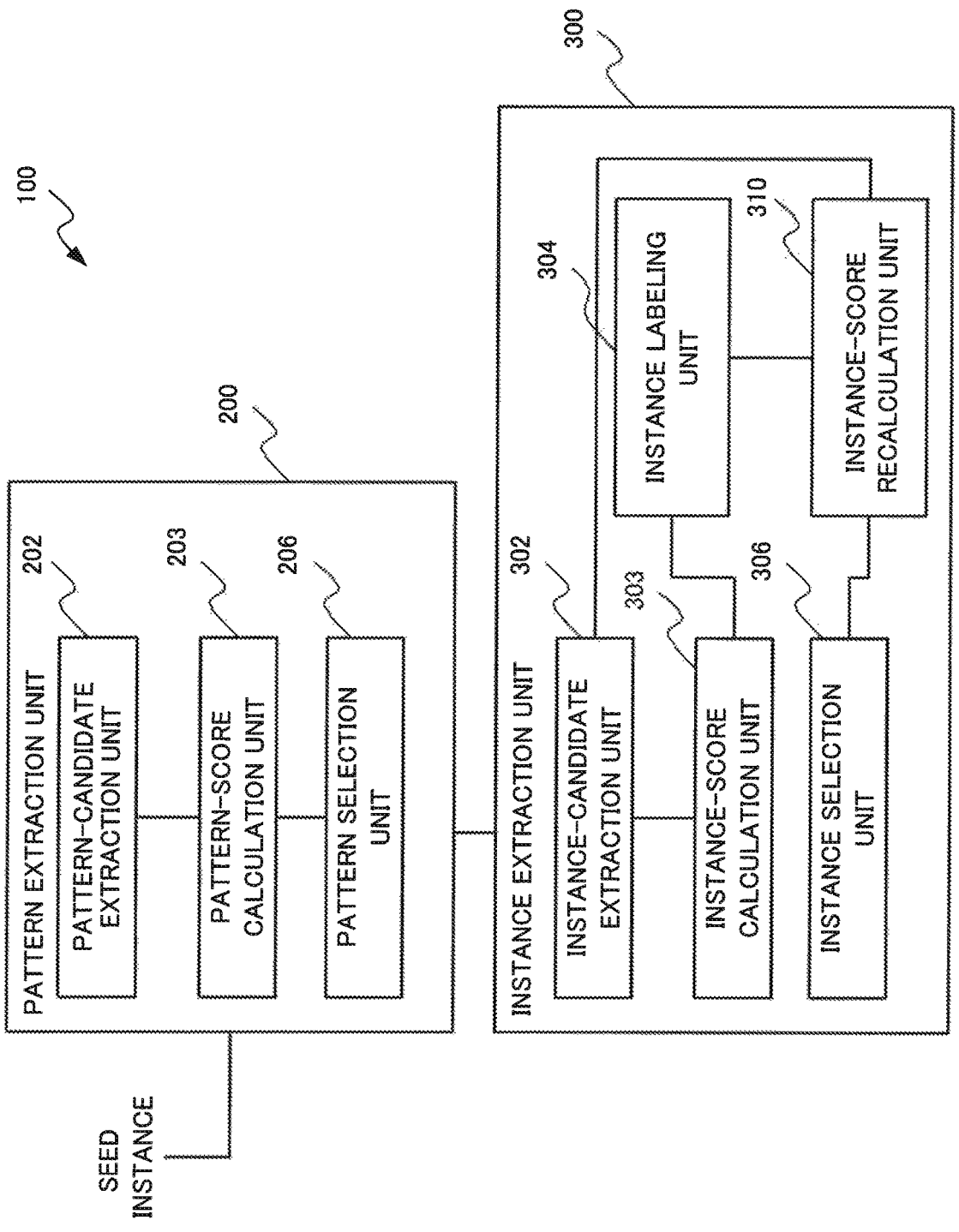
FIG. 1 is a block diagram illustrating one example of a configuration of an information processing device according to a first example embodiment in the present invention.

Next, example embodiments of the present invention will be described with reference to the drawings.

Note that the respective drawings are intended to describe the example embodiments of the present invention. However, the present invention is not limited to description of the respective drawings. Further, similar components in the respective drawings are assigned with the same numbers respectively and thereby repeated description thereof may be omitted. Further, in a drawing used for the following description, description of a component of a portion that does not relate to description of the present invention may be omitted and such a component may not be illustrated. Further, a direction of an arrow in a drawing indicates one example and does not limit a direction of a signal between blocks.

Organization of Terms

Terms used in the following description of the example embodiments in the present invention will be organized including contents overlapped with the above description.

"Document data" refer to data being a target for processing of an example embodiment in the present invention. The document data are not specifically limited. The document data may be, for example, plain text data or data including a structure such as Hyper Text Markup language (HTML). The document data may be any data, without limitation to the above, as long as being data in which a category, an instance, and a pattern to be described below can be set. Note that, in the following description, it is assumed that document data are previously stored.

A "category" refers to a set of previously determined data (knowledge). Note that, in the following description, it is assumed that information on a category is previously stored.

An "instance" refers to data (knowledge) included in a category. An "instance candidate" refers to data extracted as a candidate for an instance.

A "seed instance" refers to an instance used for processing at the beginning. The seed instance is extracted from a category, for example, in accordance with a predetermined rule.

A "pattern" refers to a context in document data including an instance. Herein, the "context" refers to a portion of data being a characteristic expression (e.g. an expression relating to a syntax structure appearing many times in document data) in document data. A "pattern candidate" refers to data extracted as a candidate for a pattern.

A "reliability score" refers to a value representing a degree (a reliable degree) of a relationship between a pattern and an instance. For example, a pattern having a high reliability score has a higher possibility relating to an instance than a pattern having a low reliability score. A relationship is not specifically limited. One example of the relationship is "co-occurrence". In this case, a reliability score is a value indicating a degree of co-occurrence of an instance and a pattern. One example of the reliability score in this case is pointwise mutual information (PMI) between an instance and a pattern. However, a value of the reliability score is not limited to PMI. Note that, in description of the respective example embodiments, as one example, description will be made by using co-occurrence.

A "label" refers to information indicating whether or not to relate to a category.

In the case of an instance, a label is information indicating whether or not an instance is included in a category. A positive label is information indicating that an instance is included in a category. A negative label is information indicating that an instance is not included in a category.

In the case of a pattern, a label is information indicating whether or not an instance relating to a pattern is included in a category. A positive label is information indicating that an instance relating to a pattern is included in a category. A negative label is information indicating that an instance relating to a pattern is not included in a category.

However, a label is not necessarily limited to two values of a positive label and a negative label. A label of an instance may include, for example, values exceeding two values, based on a degree in which an instance is included in a category.

First Example Embodiment

With reference to drawings, a first example embodiment in the present invention will be described.

[Description of a Configuration]

First, a configuration of an information processing device 100 according to the first example embodiment in the present invention will be described with reference to drawings.

FIG. 1 is a block diagram illustrating one example of the configuration of the information processing device 100 according to the first example embodiment.

As illustrated in FIG. 1, the information processing device 100 includes a pattern extraction unit 200 and an instance extraction unit 300.

The pattern extraction unit 200 receives a seed instance or an instance extracted by the instance extraction unit 300. Then, the pattern extraction unit 200 extracts a pattern by using a received instance, based on an operation to be described later. Then, the pattern extraction unit 200 transmits the extracted pattern to the instance extraction unit 300.

The instance extraction unit 300 receives a pattern from the pattern extraction unit 200. Then, the instance extraction unit 300 extracts an instance by using the received pattern, based on an operation to be described later. Then, the instance extraction unit 300 transmits the extracted instance to the pattern extraction unit 200.

The pattern extraction unit 200 and the instance extraction unit 300 repeat the above-described operations until a predetermined condition is satisfied. Herein, the predetermined condition indicates that, for example, the number of instances extracted (acquired) by the information processing device 100 exceeds a predetermined value.

Next, a detailed configuration of the information processing device 100 will be described.

As illustrated in FIG. 1, the pattern extraction unit 200 includes a pattern-candidate extraction unit 202, a pattern-score calculation unit 203, and a pattern selection unit 206.

The pattern-candidate extraction unit 202 receives an instance. As described above, this instance is a seed instance or an instance extracted by the instance extraction unit 300. Note that the pattern-candidate extraction unit 202 receives, according to the instance, a reliability score of the instance.

Then, the pattern-candidate extraction unit 202 extracts a pattern candidate relating to (co-occurring with) an instance, based on document data. However, it is unnecessary for the pattern-candidate extraction unit 202 to limit data for extracting a pattern candidate to document data. The pattern-candidate extraction unit 202 may extract a pattern candidate, for example, from data of a combination of an instance and a pattern relating to the instance or data of a combination of a pattern and an instance relating to the pattern. Note that, in this case, the information processing device 100 may previously store the above-described data on a storage unit (e.g. a database) that is not illustrated.

The pattern-score calculation unit 203 calculates a reliability score of an extracted pattern candidate. In other words, the pattern score-calculation unit 203 provides a reliability score to a pattern candidate. The pattern score-calculation unit 203 calculates a reliability score of a pattern candidate by using a reliability score of an instance. However, the pattern-score calculation unit 203 may calculate a reliability score of a pattern candidate by using another piece of information.

The pattern selection unit 206 selects (extracts) a pattern from pattern candidates, based on a reliability score provided for a pattern. For example, the pattern selection unit 206 selects, as a pattern, a pattern candidate relating to a reliability score included in a predetermined range from a topmost reliability score. Then, the pattern selection unit 206 transmits the selected pattern to the instance extraction unit 300. However, the pattern selection unit 206 transmits a reliability score relating to the selected pattern to the instance extraction unit 300.

As illustrated in FIG. 1, the instance extraction unit 300 includes an instance-candidate extraction unit 302, an instance-score calculation unit 303, an instance labeling unit 304, an instance-score recalculation unit 310, and an instance selection unit 306.

The instance-candidate extraction unit 302 receives a pattern from the pattern extraction unit 200. However, the instance-candidate extraction unit 302 receives, according to the pattern, a reliability score of the pattern.

Then, the instance-candidate extraction unit 302 extracts an instance candidate relating to (co-occurring with) the received pattern, based on document data.

The instance-score calculation unit 303 calculates a reliability score of the extracted instance candidate. In other words, the instance-score calculation unit 303 provides a reliability score to the extracted instance candidate. The instance-score calculation unit 303 calculates a reliability score of an instance candidate by using a reliability score of a pattern. However, the instance-score calculation unit 303 may calculate a reliability score of an instance candidate by using another piece of information.

The instance labeling unit 304 selects an instance candidate to be provided with a label from instance candidates provided with a reliability score. Note that the instance labeling unit 304 does not specifically limit a method for selecting an instance candidate to be provided with a label.

The instance labeling unit 304 may select, for example, an instance candidate relating to a reliability score included in a predetermined range from a topmost reliability score.

Alternatively, the instance labeling unit 304 may select an instance candidate included in a range of a predetermined order of a reliability score. Herein, the predetermined range refers to a range including, for example, an instance candidate having a predetermined order from a top reliability score and an instance candidate in a vicinity of the instance candidate. Specifically, when a predetermined order is tenth and a vicinity is second before and after the order, instance candidates in a predetermined range are instance candidates in which reliability score orders range from eighth to twelfth.

Alternatively, the instance labeling unit 304 may select an instance candidate to be provided with a label in accordance with the number of instances selected by the instance selection unit 306. When, for example, the instance selection unit 306 selects four instances, the instance labeling unit 304 may provide a label to a fourth instance candidate and a fifth instance candidate in reliability score as a selection border. Alternatively, the instance labeling unit 304 may provide a label to a third instance candidate to a sixth instance candidate in reliability score by expanding a range.

Then, the instance labeling unit 304 provides a label to selected instance candidates.

More specifically, the instance labeling unit 304 determines whether or not an instance candidate is included in a category. Then, the instance labeling unit 304 provides a positive label to an instance candidate that is included in the category and provides a negative label to an instance candidate that is not included in the category.

In this manner, the instance labeling unit 304 provides a label to at least a part of instance candidates.

Note that the instance labeling unit 304 may provide a label to all instance candidates.

The instance-score recalculation unit 310 updates (recalculates) a reliability score of an instance candidate provided with a label, based on the label.

The instance-score recalculation unit 310 will be described in detail with reference to a drawing.

Figure 2:
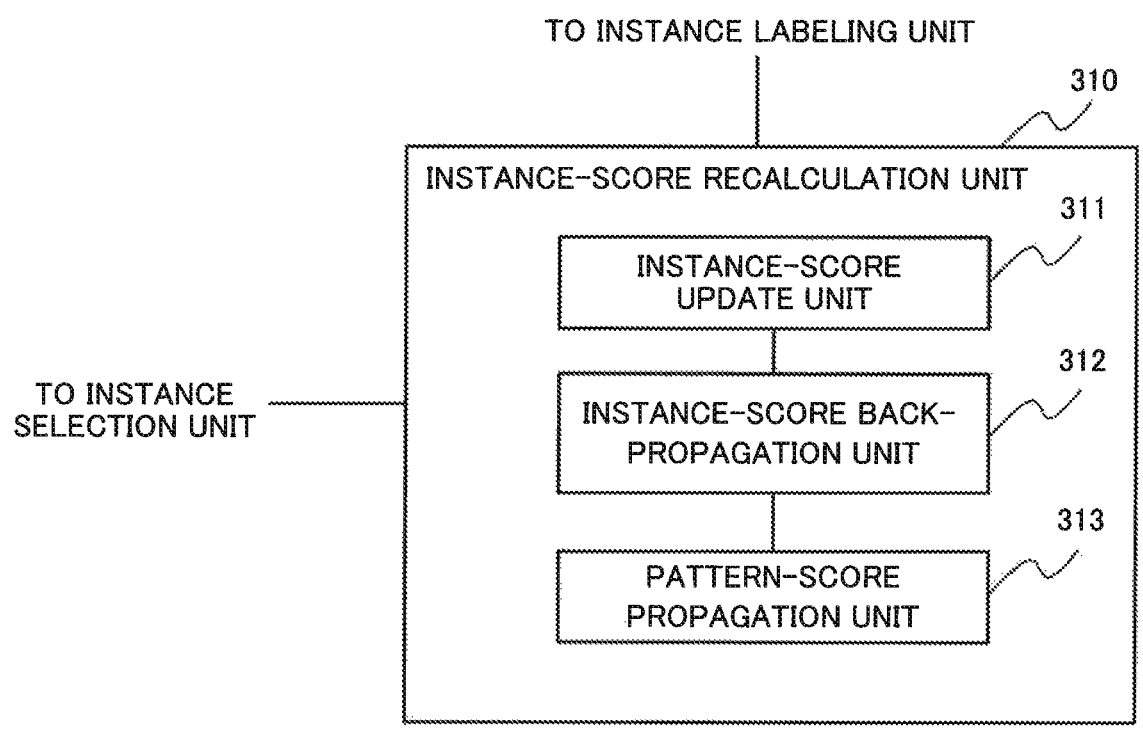
FIG. 2 is a block diagram illustrating one example of a configuration of an instance-score recalculation unit according to the first example embodiment.

FIG. 2 is a block diagram illustrating one example of a configuration of the instance-score recalculation unit 310 according to the first example embodiment.

As illustrated in FIG. 2, the instance-score recalculation unit 310 includes an instance-score update unit 311, an instance-score back-propagation unit 312, and a pattern-score propagation unit 313.

The instance-score update unit 311 updates a reliability score of an instance candidate, based on a label.

The instance-score back-propagation unit 312 updates a reliability score of a pattern received by the instance-candidate extraction unit 302, based on the updated reliability score of the instance candidate.

The pattern-score propagation unit 313 updates a reliability score of an instance candidate, based on the reliability score of the pattern updated in the instance-score back-propagation unit 312.

Note that detailed operations of the instance-score recalculation unit 310 and each component described above will be described later.

Return to description using FIG. 1.

The instance selection unit 306 selects, as an extracted instance, an instance candidate of a predetermined range from a top reliability score, based on an updated reliability score. Then, the instance selection unit 306 transmits the selected instance to the pattern extraction unit 200. The instance selection unit 306 transmits a reliability score according to the instance.

[Description of an Operation]

Next, with reference to a drawing, an operation of the information processing device 100 will be described.

Figure 3:
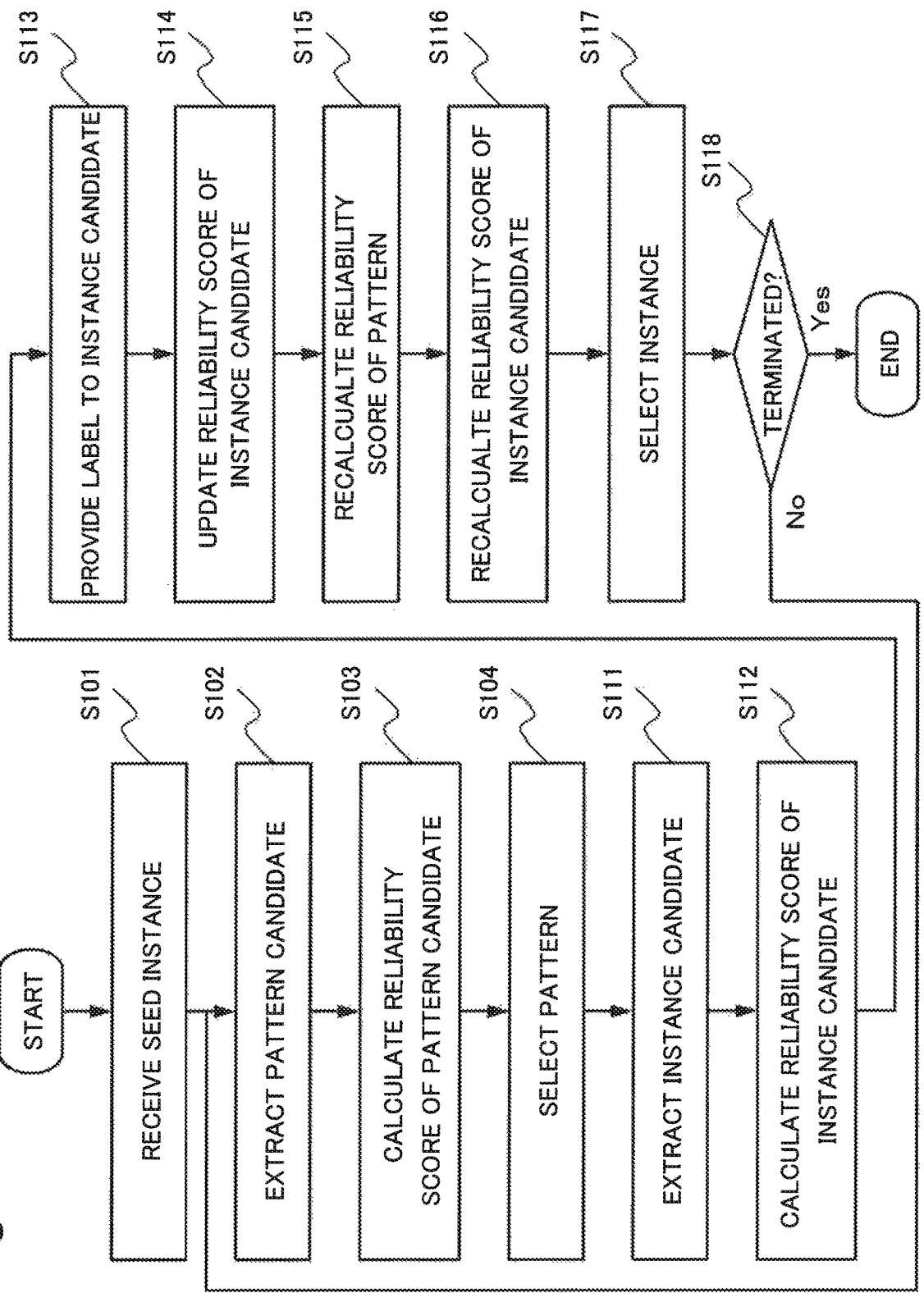
FIG. 3 is a flowchart illustrating one example of an operation of the information processing device according to the first example embodiment.

FIG. 3 is a flowchart illustrating one example of an operation of the information processing device 100 according to the first example embodiment.

The pattern-candidate extraction unit 202 receives a seed instance (step S101). The pattern-candidate extraction unit 202 receives an initial value (e.g. 1.0) of a reliability score of the seed instance.

Next, the pattern-candidate extraction unit 202 extracts, as a pattern candidate, a pattern candidate relating to (co-occurring with) the seed instance (step S102).

The pattern-score calculation unit 203 calculates a reliability score of the extracted pattern candidate (step S103).

The pattern selection unit 206 selects, from pattern candidates, a pattern to be transmitted to the instance extraction unit 300, based on the reliability score (step S104).

Next, the instance-candidate extraction unit 302 extracts an instance candidate relating to (co-occurring with) the selected pattern (step S111).

The instance-score calculation unit 303 calculates a reliability score of the extracted instance candidate (step S112).

The instance labeling unit 304 selects an instance candidate to be provided with a label from instance candidates in which a reliability score has been calculated. Then, the instance labeling unit 304 provides a label to the selected instance candidate (step S113).

The instance-score update unit 311 updates a reliability score of the instance candidate, based on the label (step S114). More specifically, the instance-score update unit 311 increases a reliability score of an instance candidate provided with a positive label and decreases a reliability score of an instance candidate provided with a negative label. When, for example, a reliability score has a value lying between "0" and "1", the instance-score update unit 311 may set a reliability score of an instance candidate provided with a positive label to be "1" and may set a reliability score of an instance candidate provided with a negative label to be "0".

The instance-score back-propagation unit 312 recalculates (corrects) a reliability score of a pattern relating to an instance candidate, based on the corrected reliability score of the instance candidate (step S115).

The pattern-score propagation unit 313 recalculates (corrects) a reliability score of an instance candidate, based on the recalculated reliability score of the pattern (step S116).

The instance selection unit 306 selects, from instance candidates, an instance to be transmitted to the pattern extraction unit 200, based on the recalculated reliability score of the instance candidate (step S117).

When step S117 is terminated, the information processing device 100 determines whether or not the processing is terminated (step S118). In other words, the information processing device 100 determines whether or not a predetermined condition (e.g. the number of extracted (acquired) instances exceeds a threshold) is satisfied.

When the condition is not satisfied (No in step S118), the information processing device 100 returns to step S102 and repeats a similar operation.

When the condition is satisfied (Yes in step S118), the information processing device 100 terminates the operation.

Description of an Advantageous Effect

Next, an advantageous effect of the information processing device 100 according to the first example embodiment will be described.

The information processing device 100 can achieve an advantageous effect of appropriately selecting an instance.

The reason is as follows.

The pattern-candidate extraction unit 202 of the pattern extraction unit 200 extracts a pattern candidate relating to (co-occurring with) an instance.

The pattern-score calculation unit 203 calculates a reliability score of the extracted pattern candidate.

The pattern selection unit 206 selects, as an extracted pattern, a pattern candidate in which a reliability score is included in a predetermined range.

Then, the instance-candidate extraction unit 302 of the instance extraction unit 300 extracts an instance candidate relating to (co-occurring with) the selected pattern.

The instance-score calculation unit 303 calculates a reliability score for the extracted instance candidate.

The instance labeling unit 304 selects an instance candidate being a target of the instance-score recalculation unit 310. Then, the instance labeling unit 304 provides, based on whether or not an instance candidate is included in a category, information (a label) indicating whether or not to be included in a category to the selected instance candidate.

The instance-score recalculation unit 310 recalculates a reliability score of an instance candidate, based on the label of the selected instance candidate.

Then, the instance selection unit 306 selects an instance, based on the recalculated (corrected) reliability score.

In this manner, the information processing device 100 reflects information (a label) on whether or not to be included in a category in a reliability score.

Note that, for more detail, the instance-score update unit 311 of the instance-score recalculation unit 310 raises a reliability score of an instance candidate (an instance candidate that is included in a category) provided with a positive label. Further, the instance-score update unit 311 lowers a reliability score of an instance candidate (an instance candidate that is not included in a category) provided with a negative label.

The instance-score back-propagation unit 312 recalculates (corrects) a reliability score of a relating (co-occurring) pattern, based on an updated reliability score of an instance candidate.

The pattern-score propagation unit 313 recalculates (corrects) a reliability score of an instance candidate, based on the corrected reliability score of the pattern.

In this manner, the instance-score recalculation unit 310 updates a reliability score of an instance candidate in association with a label that is information indicating whether or not an instance candidate is included in a category. Specifically, the instance-score recalculation unit 310 decreases a reliability score of an instance candidate that is not included in a category and increases a reliability score of an instance candidate included in a category.

In this manner, the information processing device 100 reflects information (a label) on whether or not to be included in a category in a reliability score of an instance candidate.

Modified Example of the Configuration

A modified example of the configuration of the first example embodiment will be described.

The information processing device 100 described above is configured as described below.

Each configuring unit of the information processing device 100 may include a hardware circuit, specifically, a circuitry. Herein, the circuitry is wording conceptually including a single device, multiple devices, or a chipset.

Further, in the information processing device 100, each configuring unit may be configured using multiple devices connected via a network. In this case, the information processing device 100 may be configured as a system including multiple devices. Note that this system may be provides as a service (Software as a Service) which provides software via a network and the like and in which a user invokes and uses a necessary service when needed.

For example, each configuration of the information processing device 100 may be configured using a group of devices (a cloud) connected via a network. Therefore, the above-described circuitry may include a cloud.

In the information processing device 100, for example, the pattern extraction unit 200 and the instance extraction unit 300 may be configured as a separate device.

Further, each configuration included in at least one of the pattern extraction unit 200 or the instance extraction unit 300 may be configured as a device connected via a network, a bus, or the like.

FIG. 20 is a block diagram illustrating one example of a configuration of an information processing device 102 that is one example in such a case. The information processing device 102 relates to a first modified example of the configuration of the information processing device 100.

The information processing device 102 includes an instance labeling unit 304 and an instance-score recalculation unit 310. The instance labeling unit 304 and the instance-score recalculation unit 310 operate similarly to the instance labeling unit 304 and the instance-score recalculation unit 310 in the information processing device 100.

In other words, the instance labeling unit 304 receives a reliability score and an instance candidate from a component comparable to an instance-score calculation unit 303 that is not illustrated and selects an instance candidate to be provided with a label. Then, the instance labeling unit 304 provides a label to the selected instance candidate.

The instance-score recalculation unit 310 recalculates a reliability score of an instance candidate, based on the label. Note that the instance-score recalculation unit 310 may use, in recalculation, a pattern and a reliability score of the pattern included in a component comparable to the instance-candidate extraction unit 302.

Then, the instance-score recalculation unit 310 transmits the instance candidate in which the reliability score is updated to a component comparable to the instance selection unit 306.

The information processing device 102 can achieve, based on the above-described operations, an advantageous effect similar to the advantageous effect of the information processing device 100.

The reason is that, as described above, the instance labeling unit 304 selects an instance candidate being a target of the instance-score recalculation unit 310. Then, the instance labeling unit 304 provide, based on whether or not an instance candidate is included in a category, information (a label) indicating whether or not to be included in a category to the selected instance candidate. Then, the instance-score recalculation unit 310 recalculates a reliability score of an instance candidate, based on the label of the selected instance candidate.

In this manner, the information processing device 102 reflects information (a label) on whether or not to be included in a category in a reliability score.

Note that the information processing device 102 is a minimum configuration in the present invention.

Further, in the information processing device 100, a plurality of configuring units may include one piece of hardware.

Further, the information processing device 100 may be realized as a computer device including a central processing unit (CPU), a read only memory (ROM), and a random access memory (RAM). The information processing device 100 may be realized as a computer device including, in addition to the above-described configuration, an input/output circuit (IOC) and a network interface circuit (NIC).

Figure 4:
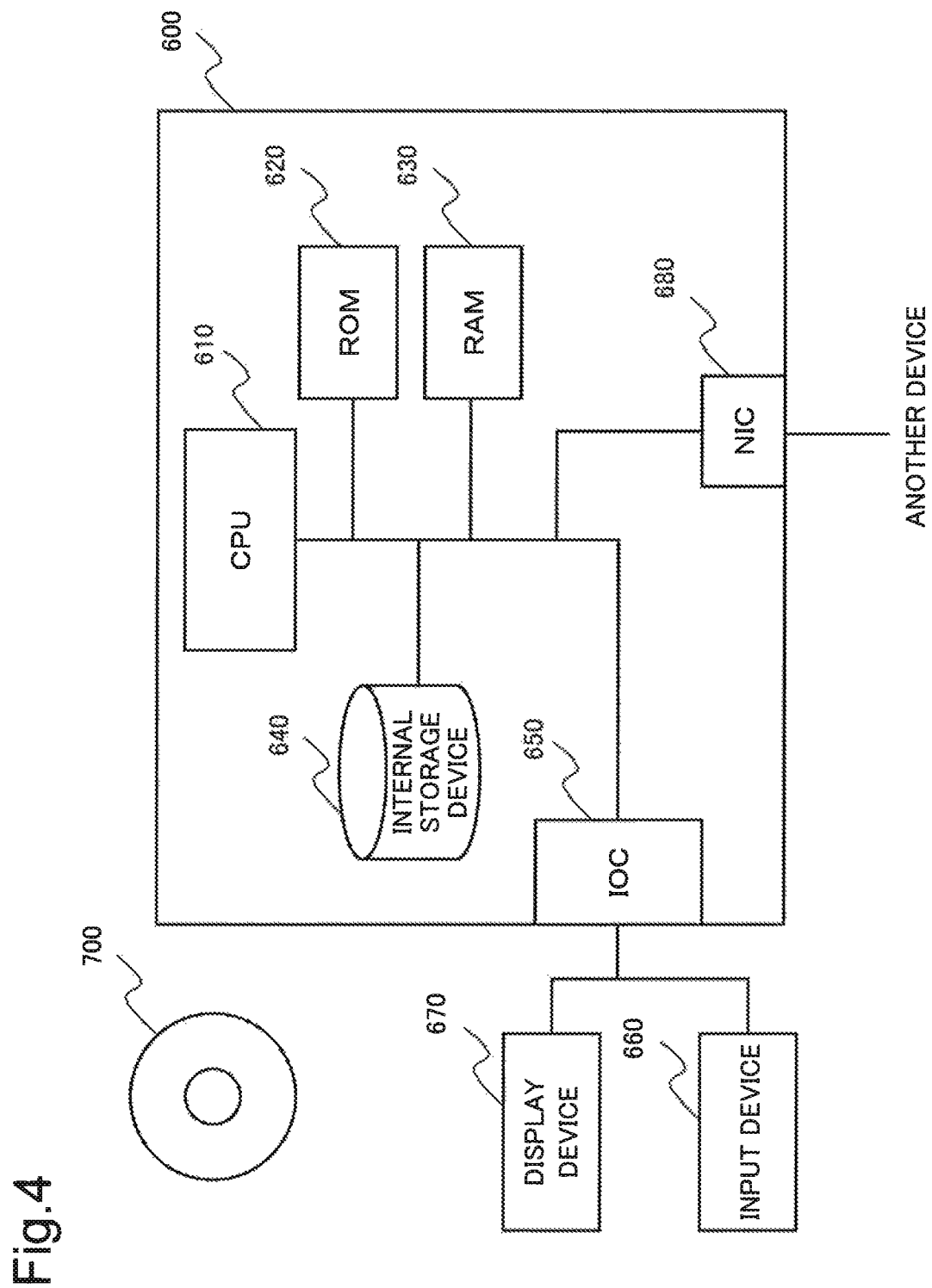
FIG. 4 is a block diagram illustrating one example of a configuration using a CPU according to the first example embodiment.

FIG. 4 is a block diagram illustrating one example of a configuration of an information processing device 600 using a CPU.

The information processing device 600 includes a CPU 610, a ROM 620, a RAM 630, an internal storage device 640, an IOC 650, and an NIC 680, and configures a computer device.

The CPU 610 reads a program from the ROM 620. The CPU 610 controls the RAM 630, the internal storage device 640, the IOC 650, and the NIC 680, based on the read program. Then, the computer including the CPU 610 controls these components and realizes each function as the pattern extraction unit 200 and the instance extraction unit 300 illustrated in FIG. 1.

The CPU 610 may use, when realizing each function, the RAM 630 or the internal storage device 640 as a temporary storage medium for a program.

Alternatively, the CPU 610 may read a program included in a storage medium 700 embodying a program in computer-readably manner, by using a storage medium read device that is not illustrated. Alternatively, the CPU 610 may receive a program from an external device that is not illustrated via the NIC 680, store the read program on the RAM 630, and operate based on the stored program.

The ROM 620 stores a program executed by the CPU 610 and fixed data. The ROM 620 is, for example, a programmable-ROM (P-ROM) or a flash ROM.

The RAM 630 temporarily stores a program executed by the CPU 610 and data. The RAM 630 is, for example, a dynamic-RAM (D-RAM).

The internal storage device 640 stores data and a program to be stored on the information processing device 600 for a long time of period. Further, the internal storage device 640 may operate as a temporary storage device of the CPU 610. The internal storage device 640 is, for example, a hard disk device, a magneto-optical disk device, a solid state drive (SSD), or a disk array device.

Herein, the ROM 620 and the internal storage device 640 each are a non-transitory storage medium. On the other hand, the RAM 630 is a transitory storage medium. Then, the CPU 610 can operate based on a program stored on the ROM 620, the internal storage medium 640, or the RAM 630. In other words, the CPU 610 can operate using a non-transitory storage medium or a transitory storage medium.

The IOC 650 mediates data between the CPU 610 and an input device 660 and between the CPU 610 and a display device 670. The IOC 650 is, for example, an IO interface card or a universal serial bus (USB) card. Further, the IOC 650 may use a radio, without limitation to a wire such as a USB.

The input device 660 is a device that receives an input instruction of an operator of the information processing device 600. The input device 660 is, for example, a keyboard, a mouse, or a touch panel.

The display device 670 is a device that displays information to the operator of the information processing device 600. The display device 670 is, for example, a liquid crystal display.

The NIC 680 relays data transfer to an external device, not illustrated, via a network. The NIC 680 is, for example, a local area network (LAN) card. Further, the NIC 680 may use a radio, without limitation to a wire.

The information processing device 600 configured in this manner can achieve an advantageous effect similar to the advantageous effect of the information processing device 100.

The reason is that the CPU 610 of the information processing device 600 can realize, based on a program, a function similar to the function of the information processing device 100.

Second Example Embodiment

With reference to drawings, a second example embodiment in the present invention will be described.

[Description of a Configuration]

First, a configuration of an information processing device 101 according to the second example embodiment will be described with reference to drawings.

Figure 5:
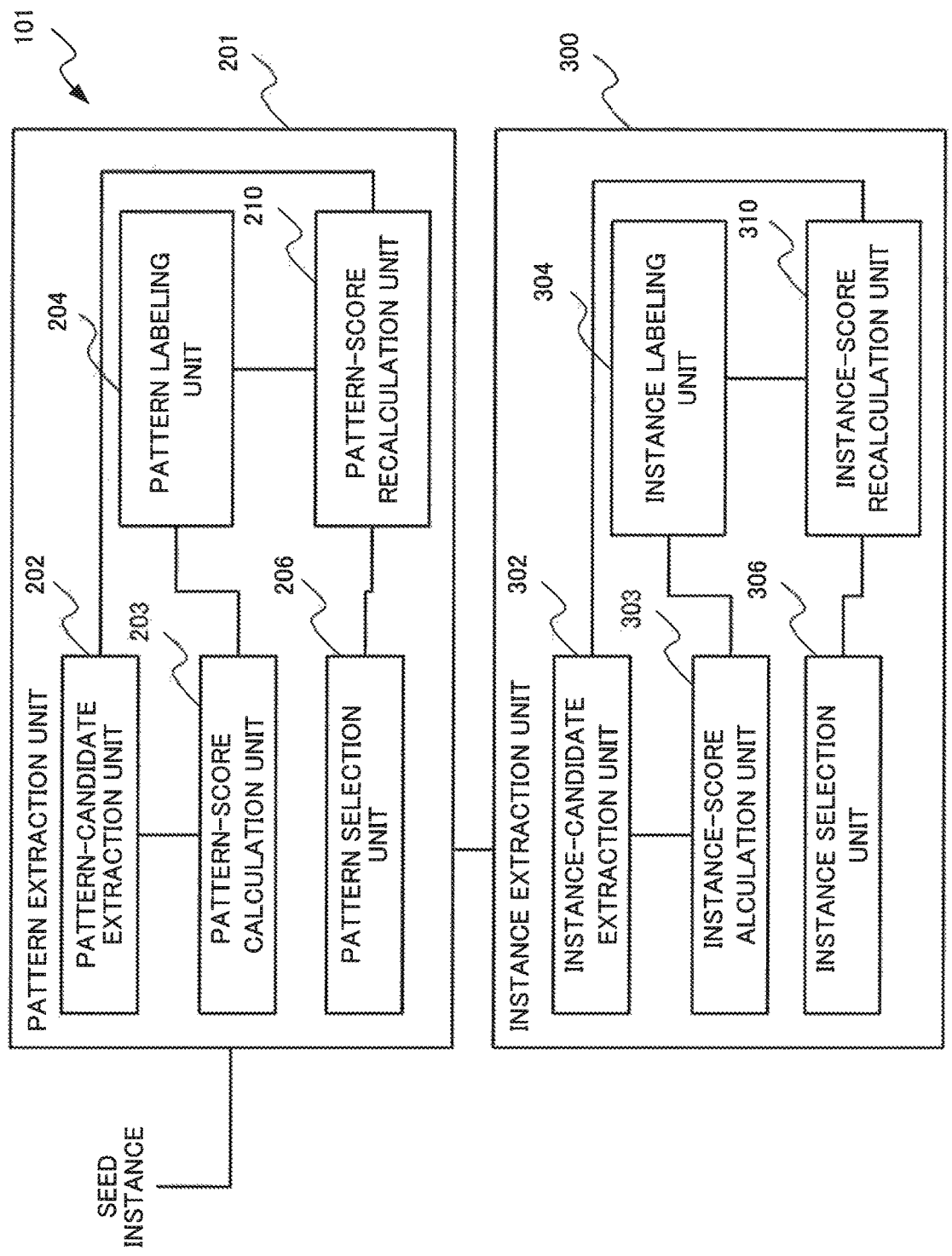
FIG. 5 is a block diagram illustrating one example of a configuration of an information processing device according to a second example embodiment.

FIG. 5 is a block diagram illustrating one example of the configuration of the information processing device 101 according to the second example embodiment. Note that the information processing device 101 according to the second example embodiment may be configured using the computer illustrated in FIG. 4.

As illustrated in FIG. 5, the information processing device 101 includes a pattern extraction unit 201 and the instance extraction unit 300.

The instance extraction unit 300 is similar to the instance extraction unit 300 of the first example embodiment, and therefore detailed description will be omitted.

The pattern extraction unit 201 includes a pattern labeling unit 204 and a pattern-score recalculation unit 210, in addition to the configuration included in the pattern extraction unit 200 according to the first example embodiment. Therefore, detailed description on a configuration similar to the configuration of the first example embodiment will be omitted, and a particular configuration of the present example embodiment will be described.

The pattern labeling unit 204 selects a pattern candidate to be provided with a label. A selection method used by the pattern labeling unit 204 is not specifically limited. The pattern labeling unit 204 may select, for example, a predetermined number of pattern candidates from a top reliability score of a pattern candidate. Alternatively, the pattern labeling unit 204 may select a pattern candidate in which an order of a reliability score of the pattern candidate is included in a predetermined range.

Then, the pattern labeling unit 204 provides, when an instance relating to (co-occurring with) the selected pattern candidate is included in a category, a positive label to the pattern candidate. The pattern labeling unit 204 provides, when an instance relating to (co-occurring with) the selected pattern candidate is not included in a category, a negative label to the pattern candidate.

Note that, when a pattern candidate relates to (co-occurs with) an instance that is included in a category and an instance that is not included in the category, the pattern labeling unit 204 may provide a label, based on a predetermined rule. When, for example, the number of instances that are included in a category is larger than the number of instances that are not included in the category, the pattern labeling unit 204 may provide a positive label. Alternatively, when even one instance is included in a category, the pattern labeling unit 204 may provide a positive label.

In this manner, the pattern labeling unit 204 provides a label to at least a part of pattern candidates.

Note that the pattern labeling unit 204 may provide a label to all pattern candidates.

The pattern-score recalculation unit 210 recalculates, based on a label provided for a pattern candidate, a reliability score of the pattern candidate.

Figure 6:
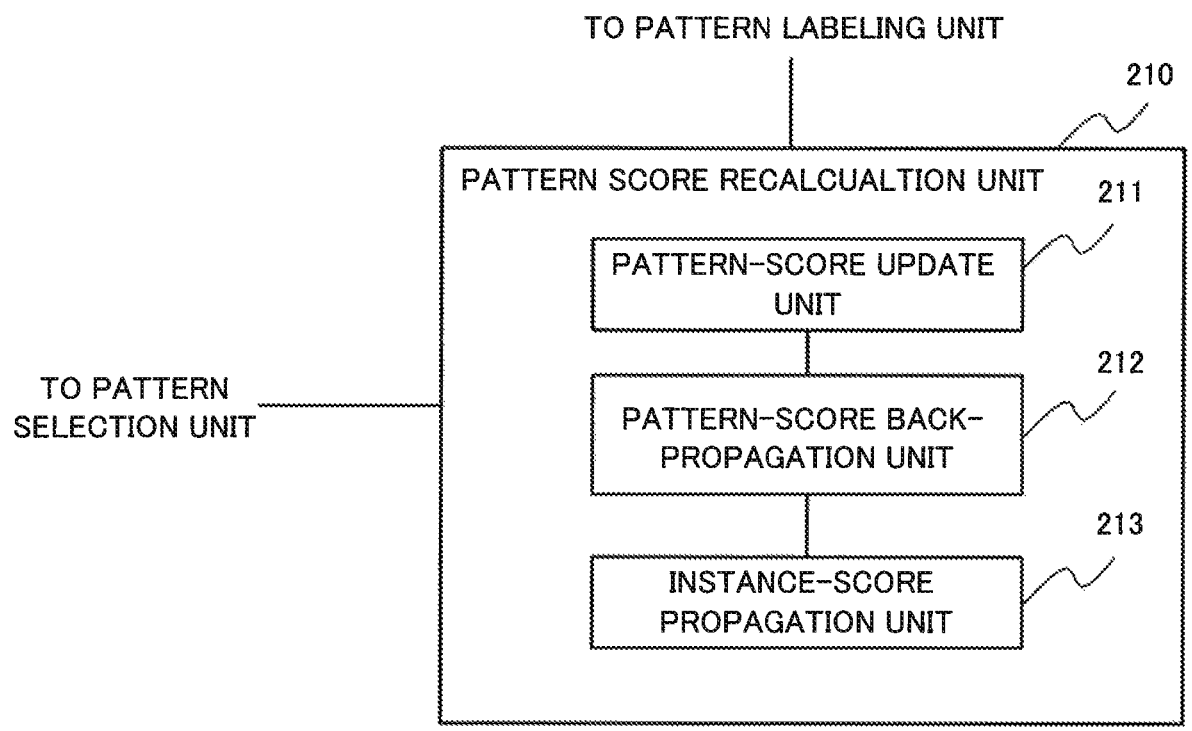
FIG. 6 is a block diagram illustrating one example of a configuration of a pattern-score recalculation unit according to the second example embodiment.

FIG. 6 is a block diagram illustrating one example of a configuration of the pattern-score recalculation unit 210 according to the second example embodiment.

As illustrated in FIG. 6, the pattern-score recalculation unit 210 includes a pattern-score update unit 211, a pattern-score back-propagation unit 212, and an instance-score propagation unit 213.

The pattern-score update unit 211 updates, based on a label provided for a pattern candidate, a reliability score of the pattern candidate. Specifically, the pattern-score update unit 211 raises a reliability score of a pattern candidate provided with a positive label and lowers a reliability score of a pattern candidate provided with a negative label.

The pattern-score back-propagation unit 212 recalculates (updates), based on the updated reliability score of the pattern candidate, a reliability score of an instance relating to the pattern candidate in which the reliability score has been updated.

The instance-score propagation unit 213 recalculates (updates), based on the reliability score of the instance updated by the pattern-score back-propagation unit 212, a reliability score of a pattern candidate relating to the instance.

Returns to description using FIG. 5.

The pattern selection unit 206 selects a pattern by using the updated reliability score.

[Description of an Operation]

Next, an operation of the information processing device 101 according to the second example embodiment will be described.

Note that, in the following description, description of an operation of a component similar to a component of the first example embodiment such as the instance extraction unit 300 will be omitted, and a particular operation of the present example embodiment will be described. In other words, operations relating to the pattern labeling unit 204 and the pattern-score recalculation unit 210 will be described.

Figure 7:
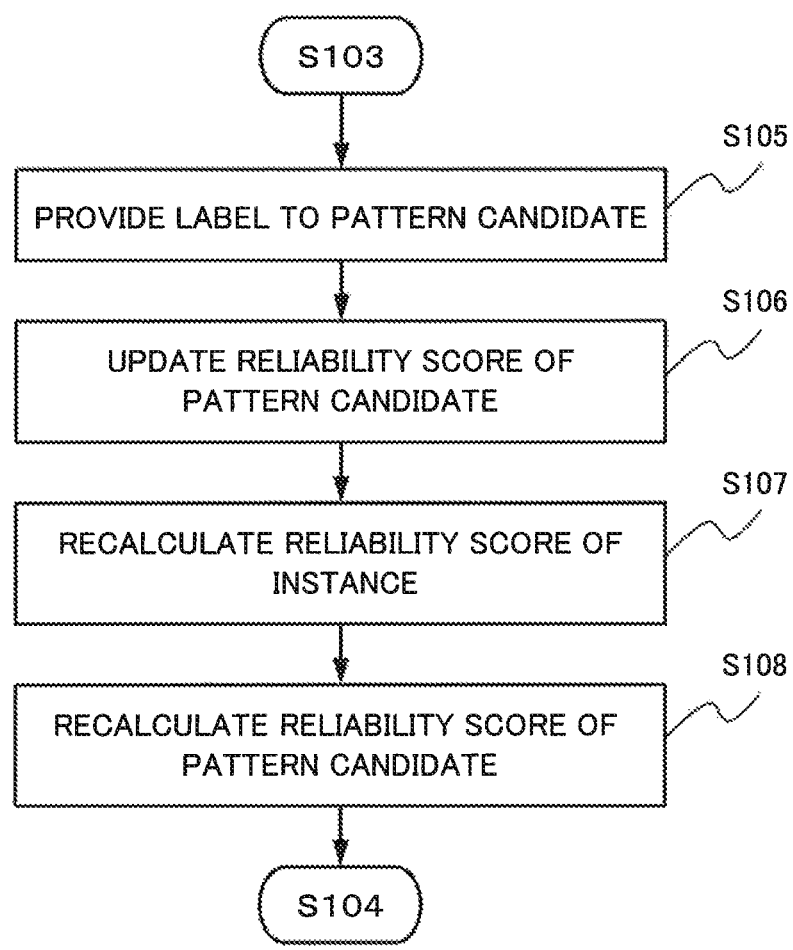
FIG. 7 is a flowchart illustrating one example of a part of operations of a pattern labelling unit and the pattern-score recalculation unit according to the second example embodiment.

FIG. 7 is a flowchart illustrating one example of operations of the pattern labelling unit 204 and the pattern-score recalculation unit 210. An operation illustrated in FIG. 7 is an operation executed between step S103 and step S104 in FIG. 3.

The pattern labeling unit 204 selects a pattern candidate to be provided with a label. The pattern labeling unit 204 may select, as a pattern candidate to be provided with a label, for example, a predetermined number of pattern candidates from a large reliability score. However, the pattern labeling unit 204 may select all pattern candidates.

Then, the pattern labeling unit 204 provides a label to the selected pattern candidate (step S105). Specifically, the pattern labeling unit 204 provides, when an instance relating to a pattern candidate is included in a category, a positive label to the pattern candidate. On the other hand, the pattern labeling unit 204 provides, when an instance relating to a pattern candidate is not included in a category, a negative label to the pattern candidate.

Next, the pattern-score update unit 211 of the pattern-score recalculation unit 210 updates a reliability score of the pattern candidate, based on the provided label (step S106). Specifically, the pattern-score update unit 211 increases a reliability score of a pattern candidate provided with a positive label. On the other hand, the pattern-score update unit 211 decreases a reliability score of a pattern candidate provided with a negative label. When, for example, a reliability score has a value lying between "0" and "1", the pattern-score update unit 211 may set a reliability score of a pattern candidate provided with a positive label to be "1" and may set a reliability score of a pattern candidate provided with a negative label to be "0".

Next, the pattern-score back-propagation unit 212 recalculates (corrects), based on the updated reliability score of the pattern candidate, a reliability score of an instance relating to the pattern candidate (step S107).

The instance-score propagation unit 213 recalculates (corrects), based on the corrected reliability score of the instance, a reliability score of a pattern candidate relating to the instance (step S108).

Thereafter, the information processing device 101 operates similarly to the information processing device 100 of the first example embodiment.

In this manner, the pattern labeling unit 204 provides a positive label to a pattern candidate relating to an instance that is included in a category and provides a negative label to a pattern candidate relating to an instance that is not included in the category.

Then, the pattern-score recalculation unit 210 raises, based on a label, a reliability score of a pattern candidate relating to an instance that is included in a category and lowers a reliability score of a pattern candidate relating to an instance that is not included in the category.

Then, the pattern selection unit 206 according to the second example embodiment selects, as described above, a pattern candidate by using a reliability score corrected based on a label.

In other words, the pattern extraction unit 201 updates a reliability score in such a way that a pattern candidate relating to an instance that is included in a category is selected preferentially to a pattern candidate relating to an instance that is not included in the category.

In this manner, the pattern extraction unit 201 associates a label with a reliability score of a pattern candidate.

Therefore, the pattern extraction unit 201 according to the second example embodiment extracts a more appropriate pattern than the pattern extraction unit 200 of the first example embodiment.

Because of using, as described above, a pattern extracted more appropriately, the instance extraction unit 300 according to the second example embodiment can select a more appropriate instance than that according to the first example embodiment.

In other words, the information processing device 101 according to the second example embodiment can select a more appropriate instance than the information processing device 100 according to the first example embodiment.

Description of an Advantageous Effect

Next, an advantageous effect of the information processing device 101 according to the second example embodiment will be described.

The information processing device 101 further achieves an advantageous effect of selecting a more appropriate instance, in addition to the advantageous effect of the first example embodiment.

The reason is as follows.

The patter labeling unit 204 provides information (a label) indicating whether or not an instance relating to a pattern candidate is included in a category to a pattern candidate.

The pattern-score update unit 211 of the pattern-score recalculation unit 210 recalculates a reliability score of the pattern candidate, based on the label. Specifically, the pattern-score update unit 211 raises a reliability score of a pattern candidate provided with a positive label and lowers a reliability score of a pattern candidate provided with a negative label The pattern-score back-propagation unit 212 recalculates a reliability score of a related instance, based on the recalculated reliability score of the pattern candidate.

Then, the instance-score propagation unit 213 recalculates a reliability score of a pattern candidate, based on the recalculated reliability score of the instance As a result, it is possible for the pattern extraction unit 201 to select a pattern considering whether or not a related instance is included in a category and transmit the selected pattern to the instance extraction unit 300.

Third Example Embodiment

With reference to a drawing, a third example embodiment in the present invention will be described.

[Description of a Configuration]

The third example embodiment is different from the first example embodiment in a configuration of an instance-score recalculation unit 310. Therefore, detailed description of a configuration similar to a configuration of the first example embodiment will be omitted, and the configuration of the instance-score recalculation unit 310 according to the third example embodiment will be described with reference to drawings.

Note that the third example embodiment may be configured using the computer illustrated in FIG. 4.

Figure 8:
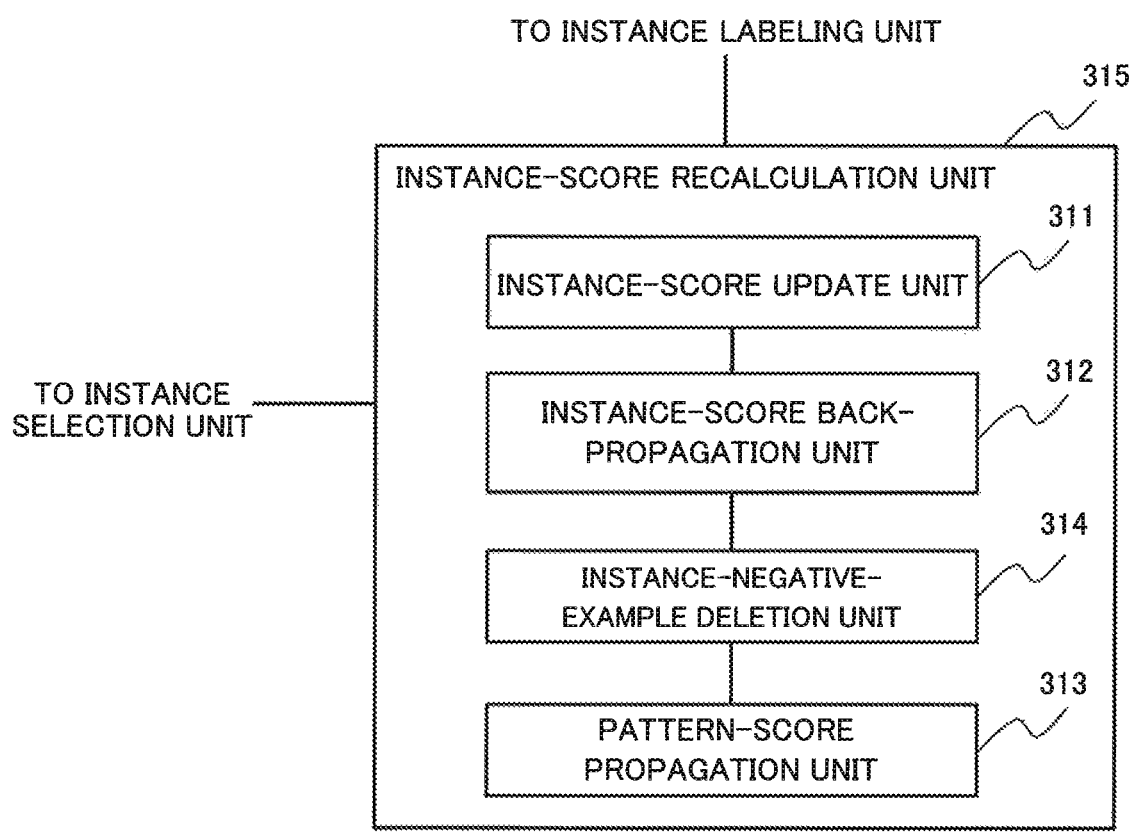
FIG. 8 is a block diagram illustrating one example of a configuration of an instance-score recalculation unit according to a third example embodiment.

FIG. 8 is a block diagram illustrating one example of the configuration of an instance-score recalculation unit 315 according to the third example embodiment.

As illustrated in FIG. 8, the instance-score recalculation unit 315 includes an instance-negative-example deletion unit 314, in addition to the configuration of the instance-score recalculation unit 310 in the first example embodiment. Therefore, detailed description of a configuration similar to a configuration of the first example embodiment will be omitted, and the instance-negative-example deletion unit 314 will be described.

The instance-negative-example deletion unit 314 deletes an instance candidate provided with a negative label in the instance-score back-propagation unit 312.

Therefore, the pattern-score propagation unit 313 can reduce processing for an instance candidate provided with a negative label.

Note that a position of the instance-negative-example deletion unit 314 is not limited to a position illustrated in FIG. 8. The instance-negative-example deletion unit 314 may delete an instance candidate provided with a negative label before processing of the instance-score update unit 311. Alternatively, the instance-negative-example deletion unit 314 may delete an instance candidate provided with a negative label after processing of the pattern-score propagation unit 313.

However, when the instance-negative-example deletion unit 314 deletes an instance candidate provided with a negative label after processing of the pattern-score propagation unit 313, processing in the pattern-score propagation unit 313 is not reduced.

In this manner, the instance-score recalculation unit 315 according to the third example embodiment deletes an instance candidate provided with a negative label.

Description of an Advantageous Effect

Next, an advantageous effect of the third example embodiment will be described.

The third example embodiment can achieve an advantageous effect of selecting a more appropriate instance, in addition to the advantageous effect of the first example embodiment.

The reason is as follows.

An instance candidate provided with a negative label is an instance candidate that is not an extraction (acquisition) target. Therefore, the instance-negative-example deletion unit 314 according to the third example embodiment deletes an instance candidate provided with a negative label. The reason is that the third example embodiment deletes, based on this operation, an instance candidate provided with a negative label from instance candidates to be selected.

Further, the third example embodiment can achieve an advantageous effect of reducing a load on processing.

The reason is that the instance-negative-example deletion unit 314 deletes an instance candidate provided with a negative label and therefore the number of instance candidates to be processed in the pattern-score propagation unit 313 decreases.

Fourth Example Embodiment

With reference to a drawing, a fourth example embodiment in the present invention will be described.

[Description of a Configuration]

The fourth example embodiment is different from the second example embodiment in a configuration of a pattern-score recalculation unit 210. Therefore, detailed description of a configuration similar to a configuration of the second example embodiment will be omitted, and the configuration of the pattern-score recalculation unit 210 according to the fourth example embodiment will be described. Note that the fourth example embodiment may be configured using the computer illustrated in FIG. 4.

Figure 9:
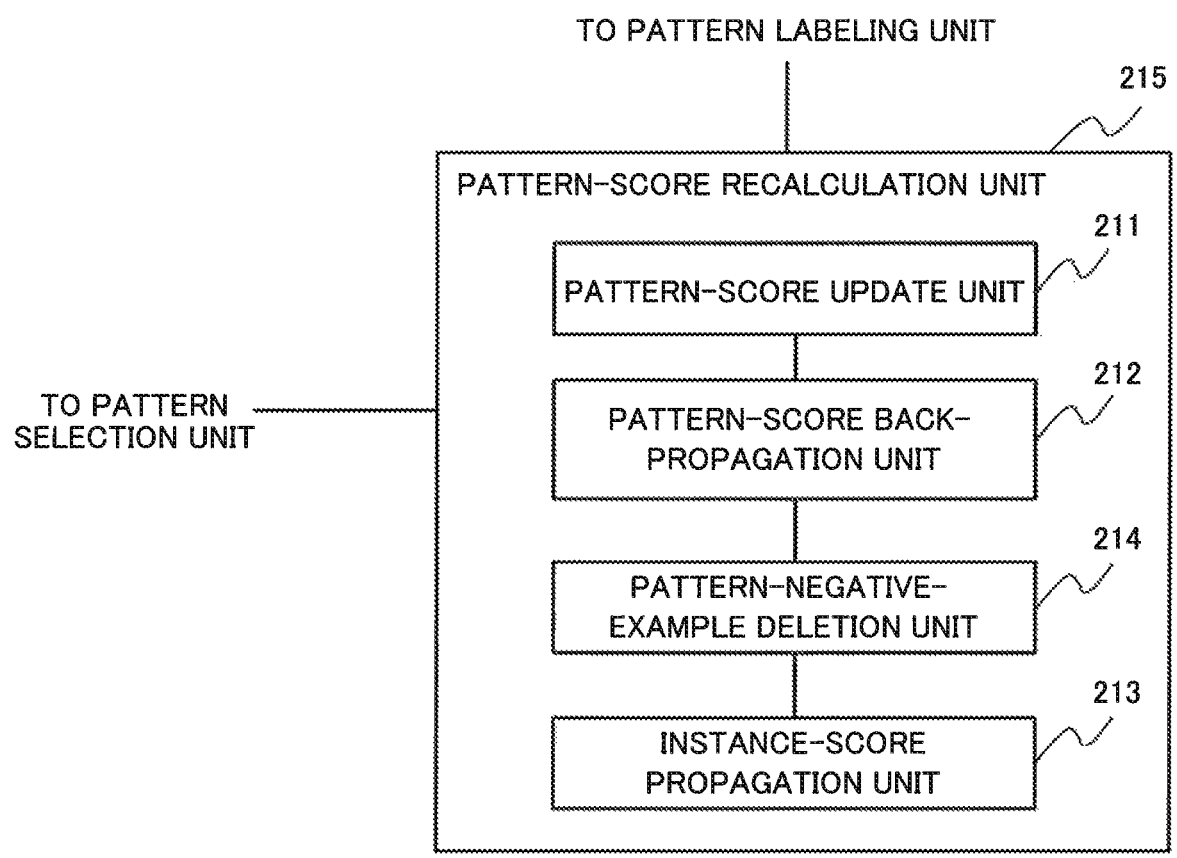
FIG. 9 is a block diagram illustrating one example of a configuration of a pattern-score recalculation unit according to a fourth example embodiment.

FIG. 9 is a block diagram illustrating one example of a configuration of a pattern-score recalculation unit 215 according to the fourth example embodiment.

As illustrated in FIG. 9, the pattern-score recalculation unit 215 includes a pattern-negative-example deletion unit 214, in addition to the configuration of the pattern-score recalculation unit 210 in the second example embodiment. Therefore, detailed description of a configuration similar to a configuration of the second example embodiment will be omitted, and the pattern-negative-example deletion unit 214 will be described.

The pattern-negative-example deletion unit 214 deletes a pattern candidate provided with a negative label in the pattern-score back-propagation unit 212.

Therefore, the instance-score propagation unit 213 can reduce processing for a pattern candidate provided with a negative label.

Note that, a position of the pattern-negative-example deletion unit 214 is not limited to a position illustrated in FIG. 9. The pattern-negative-example deletion unit 214 may delete a pattern candidate provided with a negative label before processing of the pattern-score update unit 211. Alternatively, the pattern-negative-example deletion unit 214 may delete a pattern candidate provided with a negative label after processing of the instance-score propagation unit 213.

However, when the pattern-negative-example deletion unit 214 deletes a pattern candidate provided with a negative label after processing of the instance-score propagation unit 213, processing in the instance-score propagation unit 213 is not reduced.

In this manner, the pattern-score recalculation unit 215 according to the fourth example embodiment deletes a pattern candidate provided with a negative label.

Description of an Advantageous Effect

Next, an advantageous effect of the fourth example embodiment will be described.

The fourth example embodiment can achieve an advantageous effect of selecting a more appropriate instance, in addition to the advantageous effect of the second example embodiment.

The reason is as follows.

A pattern candidate provided with a negative label is a pattern candidate relating to an instance that is not included in a category. In other words, a pattern candidate provided with a negative label is a pattern candidate that may not be used to select an instance. Therefore, in the fourth example embodiment, the pattern-negative-example deletion unit 214 deletes a pattern candidate provided with a negative label. The reason is that the fourth example embodiment does not use, based on this operation, a pattern candidate provided with a negative label to select an instance.

Further, the fourth example embodiment can achieve an advantageous effect of reducing a load on processing.

The reason is that the pattern-negative-example deletion unit 214 deletes a pattern candidate provided with a negative label and therefore the number of pattern candidates to be processed in the instance-score propagation unit 213 decreases.

DETAILED EXAMPLES

Next, using a concrete value, operations of example embodiments of the present invention will be described.

Detailed Example 1

First, a detailed operation of the information processing device 100 according to the first example embodiment will be described.
(Preconditions)
Preconditions of an operation are described.
It is assumed that data (document data) being a target are previously stored on the information processing device 100.
It is assumed that a category is a set of "foods". It is assumed that information on a category is previously stored.
It is assumed that seed instances are "pasta" and "fish". In the following description, a variable for an instance and an instance candidate is designated as "I". An identifier of an instance is designated as a variable i (i is a positive integer). Hereinafter, "pasta" is designated as "$I_1$". "Fish" is designated as "$I_2$".

A variable for a pattern and a pattern candidate is designated as a variable P. An identifier of a pattern is designated as a variable j (j is a positive integer).

A function representing a reliability score for an instance and a pattern is designated as a function r( ). An argument of the function r( ) is an instance or a pattern. Note that, in the following description, it is assumed that PMI is used in calculation of a reliability score. It is assumed that a function indicating PMI is "PMI(an instance, a pattern)".

Further, a combination of an instance and a reliability score is represented as (an instance, a reliability score). In the similar way, a combination of a pattern and a reliability score is represented as (a pattern, a reliability score).

It is assumed that an initial value of a reliability score of the seed instance is "1.000".

It is assumed that a set of combinations of data is represented by using [ ].

Further, in calculation of a concrete number, the number is rounded off to a fourth decimal place.
(Detailed Operations)
A reliability score of each seed instance is as follows.

$r(I_1)=1.000$ $r(I_2)=1.000$

Therefore, a seed instance acquired by the information processing device 100 is, for example, as follows.

Seed instance=[(pasta,1.000),(fish,1.000)]

The pattern-candidate extraction unit 202 of the pattern extraction unit 200 extracts a pattern candidate relating to (co-occurring with) an instance, based on the above-described seed instance.

Herein, it is assumed that the pattern-candidate extraction unit 202 extracts a pattern candidate "eat pasta" as a pattern candidate relating to (co-occurring with) an instance "pasta". Further, it is assumed that the pattern-candidate extraction unit 202 extracts a pattern candidate "eat fish" and a pattern candidate "go to a fish store" as a pattern candidate relating to (co-occurring with) an instance "fish".

Then, the pattern-candidate extraction unit 202 generalizes an instance included in an extracted pattern candidate. Hereinafter, it is assumed that the pattern-candidate extraction unit 202 replaces an instance with a variable X for generalization. In other words, the pattern-candidate extraction unit 202 extracts, as a pattern candidate, a pattern candidate "eat X" and a pattern candidate "go to an X store". In the following description, the pattern candidate "eat X" is designated as "$P_1$" and the pattern candidate "go to an X store" is designated as "$P_2$".

Next, the pattern-score calculation unit 203 calculates reliability scores of the pattern candidate $P_1$ and the pattern candidate $P_2$.

Specifically, the pattern-score calculation unit 203 uses following equation 1 as a reliability score of a pattern candidate.

$$r(P_j) = \frac{\sum_i (r(I_i) \times PMI(I_i, P_j))}{N_I \times \max_{pmi}} \quad \text{[Equation 1]}$$

In equation 1, $N_I$ is the number of instances. The symbol $\max_{pmi}$ is a maximum value in PMI( ) with respect to all instances and patterns. However, in a sum of numerators of equation 1, an unrelated instance and an unrelated pattern are not used to calculate the sum.

Herein, it is assumed that the pattern score-calculation unit 203 calculates each piece of PMI as described below.

$PMI(I_1,P_1)=1.500$ $PMI(I_2,P_1)=0.900$ $PMI(I_1,P_2)=NU(\text{not used})$ $PMI(I_2,P_2)=1.300$ In the above, "NU (not used)" indicates no relation (co-occurrence), i.e. that it is not a target to be processed. For example, an instance $I_1$ (pasta) does not relate to a pattern candidate $P_2$ (go to an X store). In other words, $PMI(I_1,P_2)$ is not used to calculate a reliability score of the pattern candidate $P_2$.

Further, from the above, $\max_{pmi}$ is 1.500. Note that the number of instances ($N_I$) is 2.

As a result, the pattern-score calculation unit 203 calculates a value described below as a reliability score of each pattern candidate.

$r(P_1)=(1.000\times1.500+1.000\times0.900)/(2.000\times 1.500)=0.800$ $r(P_2)=(1.000\times1.300)/(2.000\times1.500)=0.433$ The pattern selection unit 206 selects a pattern from pattern candidates, based on a reliability score. However, in this description, it is assumed that the pattern selection unit 206 selects, as a pattern, two pattern candidates from a top reliability score. Therefore, in the present case, the pattern selection unit 206 selects, as a pattern, the above-described two pattern candidates and transmits the selected pattern candidates to the instance extraction unit 300. In other words, the pattern candidate "eat X ($P_1$)" and the pattern candidate "go to an X store ($P_2$)" are patterns to be transmitted to the instance extraction unit 300.

Figure 10:
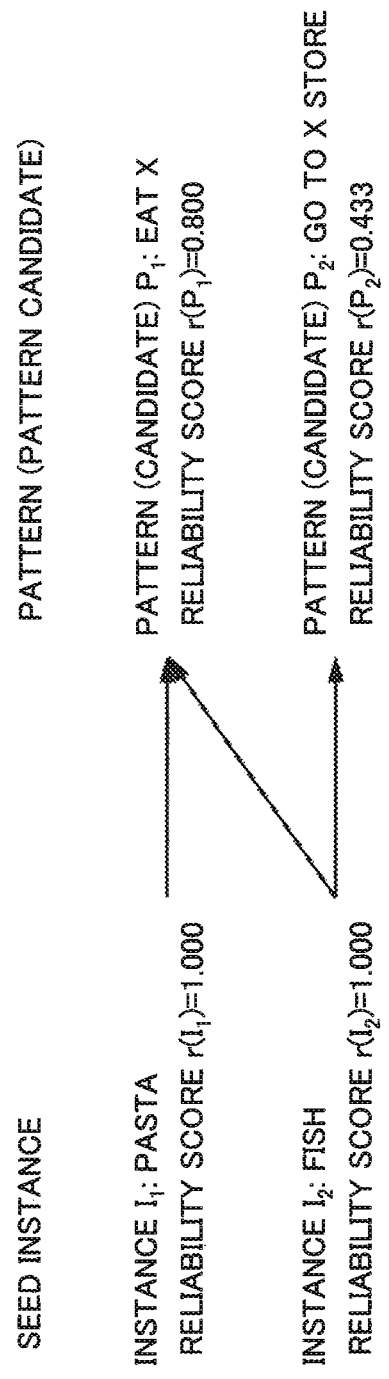
FIG. 10 is a diagram illustrating a relationship between a seed instance and a pattern in a first detailed example.

FIG. 10 is a diagram illustrating a relationship between the seed instances and the patterns transmitted to the instance extraction unit 300 by the pattern extraction unit 200. Note that FIG. 10 is also a diagram illustrating the pattern candidates and the instances in which the pattern-score calculation unit 203 calculates reliability scores.

The instance-candidate extraction unit 302 of the instance extraction unit 300 extracts an instance candidate relating to (co-occurring with) the pattern accepted.

Herein, it is assumed that the instance-candidate extraction unit 302 extracts, as the instance candidates relating to (co-occurring with) the pattern $P_1$ "eat X", instance candidates "pasta", "fish", "Italian", and "innards hot pot". Further, it is assumed that the instance-candidate extraction unit 302 extracts, as the instance candidates relating to (co-occurring with) the pattern $P_2$ "go to an X store", instance candidates "fish", "baseball", and "soccer".

Therefore, the instance-candidate extraction unit 302 extracts the instance candidates "pasta", "fish", "Italian", "innards hot pot", "baseball", and "soccer". Hereinafter, "Italian" is designated as "$I_3$". "Innards hot pot" is designated as "$I_4$". "Baseball" is designated as "$I_5$". "Soccer" is designated as "$I_6$".

Next, the instance-score calculation unit 303 calculates reliability scores for the extracted instance candidates (pasta, fish, Italian, innards hot pot, baseball, and soccer).

Specifically, the instance-score calculation unit 303 uses equation 2 described below as a reliability score of an instance candidate.

$$r(I_i) = \frac{\sum_j (r(P_j) \times PMI(I_i, P_j))}{N_P \times \max_{pmi}} \quad \text{[Equation 2]}$$

In equation 2, $N_p$ is the number of patterns. The symbol $\max_{pmi}$ is a maximum value in PMI( ) with respect to all instances and patterns, similarly to equation 1. Further, in a sum of numerators of equation 2, an unrelated instance and an unrelated pattern are not used to calculate a sum.

Herein, it is assumed that the instance-score calculation unit 303 calculates PMI in each instance candidate and pattern as described below, in addition to the above-described pieces of PMI.

$PMI(I_3,P_1)=0.750$ $PMI(I_4,P_1)=0.800$ $PMI(I_5,P_1)=NU$ $PMI(I_6,P_1)=NU$ $PMI(I_3,P_2)=NU$ $PMI(I_4,P_2)=NU$ $PMI(I_5,P_2)=1.500$ $PMI(I_6,P_2)=1.400$

As a result, the instance-score calculation unit 303 calculates, as a reliability score of each instance candidate, the following values.

Figure 11:
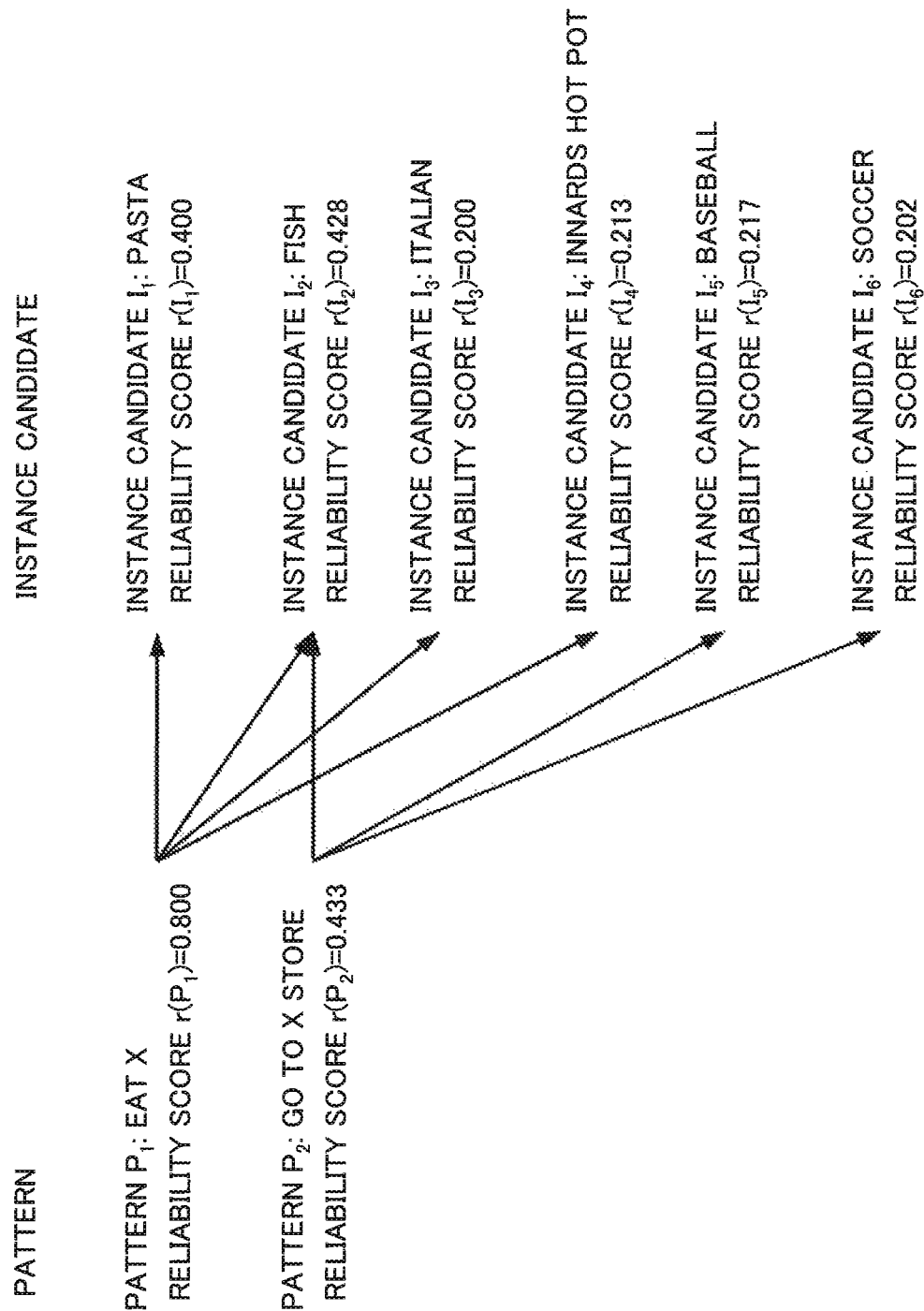
FIG. 11 is a diagram illustrating a relationship between a pattern and an instance candidate in the first detailed example.

$r(I_1)=(0.800\times1.500)/(2.000\times1.500)=0.400$ $r(I_2)=(0.800\times0.900+0.433\times1.300)/(2.000\times 1.500)=0.428$ $r(I_3)=(0.800\times0.750)/(2.000\times1.500)=0.200$ $r(I_4)=(0.800\times0.800)/(2.000\times1.500)=0.213$ $r(I_5)=(0.433\times1.500)/(2.000\times1.500)=0.217$ $r(I_6)=(0.433\times1.400)/(2.000\times1.500)=0.202$ FIG. 11 is a diagram illustrating a relationship between a pattern and an instance candidate.

Next, the instance labeling unit 304 selects an instance candidate to be provided with a label (a positive label or a negative label). Herein, it is assumed that the instance selection unit 306 selects four instances. Then, the instance labeling unit 304 provides a label to an instance candidate having a fourth largest reliability score and a label to an instance candidate having a fifth largest reliability score. Specifically, the instance labeling unit 304 provides a label to the instance candidate "$I_4$ (innards hot pot)" and the instance candidate "$I_6$ (soccer)".

In the present case, a category is food. Therefore, the instance candidate "$I_4$ (innards hot pot)" is included in a category "food". On the other hand, the instance candidate "(soccer)" is not included in the category "food".

Therefore, the instance labeling unit 304 provides a positive label to the instance candidate "$I_4$ (innards hot pot)" and provides a negative label to the instance candidate "$I_6$ (soccer)".

Next, the instance-score update unit 311 updates a reliability score of an instance candidate, based on a provided label. In the present case, the instance candidate "$I_4$ (innards hot pot)" is provided with the positive label. Therefore, the instance-score update unit 311 raises the reliability score (0.217) of the instance candidate "$I_4$ (innards hot pot)". Specifically, the instance-score update unit 311 updates the reliability score of the instance candidate "$I_4$ (innards hot pot)" to "1.000".

Further, the instance candidate "$I_6$ (soccer)" is provided with the negative label. Therefore, the instance-score update unit 311 lowers the reliability score of the instance candidate "$I_6$ (soccer)". Specifically, the instance-score update unit 311 sets the reliability score of the instance candidate "$I_6$ (soccer)" to "0.000".

Figure 12:
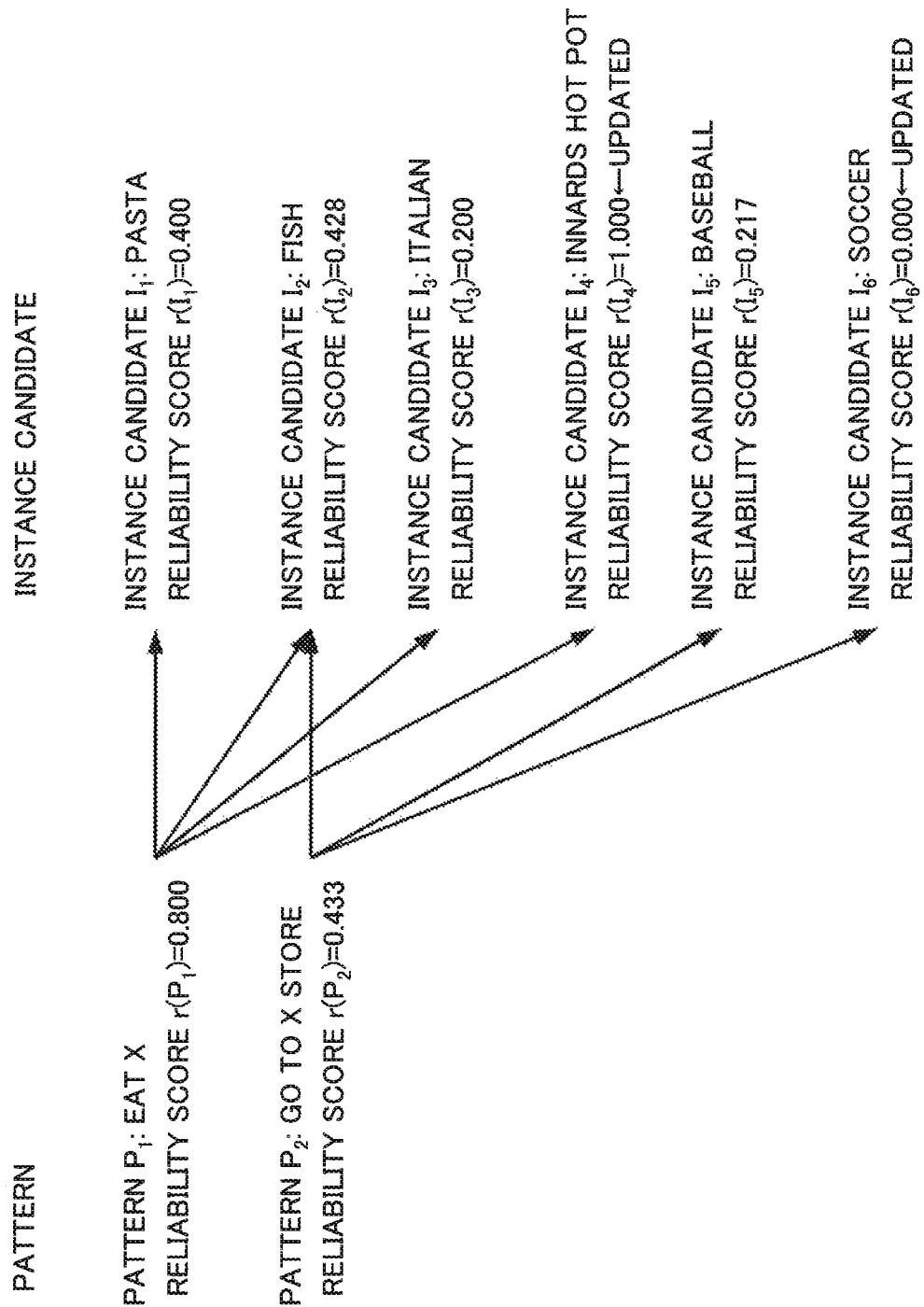
FIG. 12 is a diagram illustrating an instance candidate in which a reliability score in the first detailed example is updated.

FIG. 12 is a diagram illustrating an instance candidate in which a reliability score is updated.

The instance-score back-propagation unit 312 recalculates a reliability score of a pattern, based on an updated reliability score of an instance. Specifically, the instance-score back-propagation unit 312 calculates a reliability score of each pattern by using equation 1, as described below. However, the number of instances ($N_I$) is not "2" upon the previous calculation but "6".

$$r(P_1)=(0.400\times1.500+0.428\times0.900+0.200\times0.750+\\1.000\times0.8)/(6.000\times1.500)=0.215$$

$$r(P_2)=(0.428\times1.300+0.217\times1.500+0.000\times1.400)/\\(6.000\times1.500)=0.098$$

Figure 13:
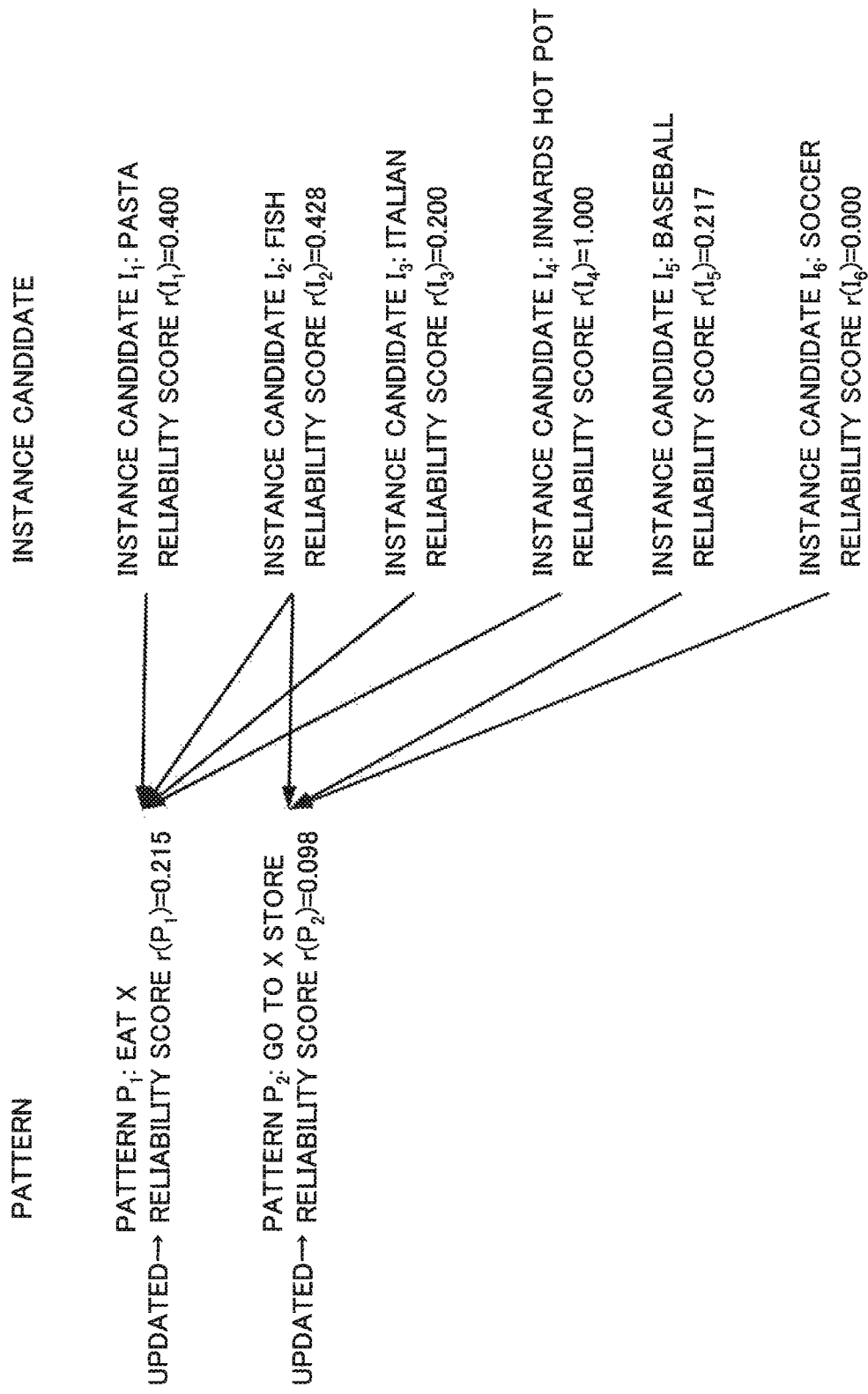
FIG. 13 is a diagram illustrating a pattern in which a reliability score in the first detailed example is updated.

FIG. 13 is a diagram illustrating a pattern in which a reliability score is updated.

The pattern-score propagation unit 313 recalculates a reliability score of an instance candidate, based on a corrected reliability score of a pattern. Specifically, a reliability score of each instance candidate is as follows.

$$r(I_1)=(0.215\times1.500)/(2.000\times1.500)=0.108$$

$$r(I_2)=(0.215\times0.900+0.098\times1.300)/(2.000\times\\1.500)=0.107$$

$$r(I_3)=(0.215\times0.750)/(2.000\times1.500)=0.054$$

$$r(I_4)=(0.215\times0.800)/(2.000\times1.500)=0.057$$

$$r(I_5)=(0.098\times1.500)/(2.000\times1.500)=0.049$$

$$r(I_6)=(0.098\times1.400)/(2.000\times1.500)=0.046$$

Figure 14:
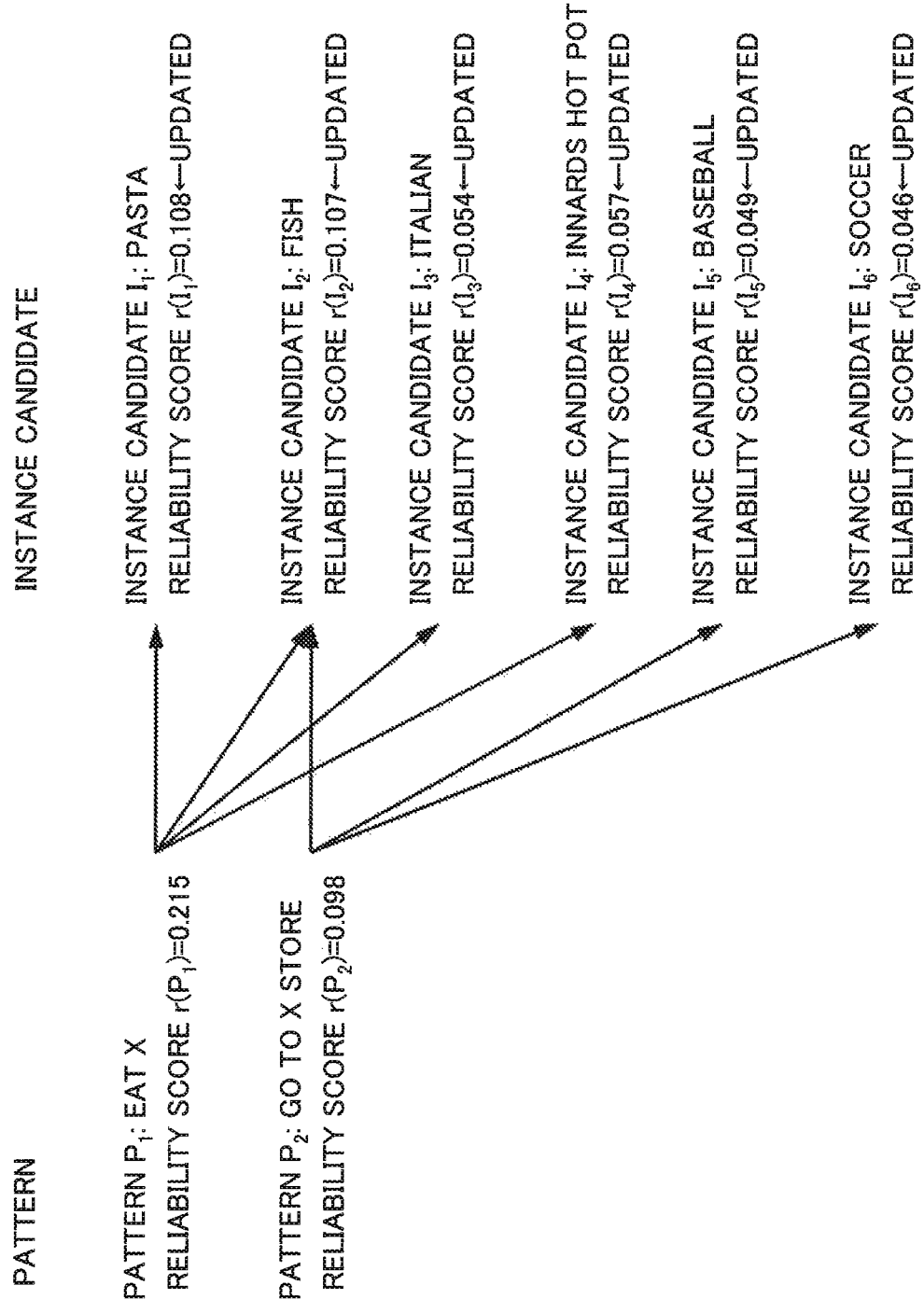
FIG. 14 is a diagram illustrating a reliability score of an instance candidate recalculated based on an updated reliability score of a pattern in the first detailed example.

FIG. 14 is a diagram illustrating a reliability score of an instance candidate recalculated based on an updated reliability score of a pattern.

The instance selection unit 306 selects an instance candidate having a predetermined number-th (e.g. fourth) largest reliability score.

In the present case, the instance selection unit 306 selects, as an instance, the instance candidates "$I_1$ (pasta)", "$I_2$ (fish)", "$I_4$ (innards hot pot)", and "$I_3$ (Italian)".

On the other hand, when reliability scores of instance candidates illustrated in FIG. 11 are used, the instance selection unit 306 selects instance candidates "$I_2$ (fish)", "$I_1$ (pasta)", "$I_5$ (baseball)", and "$I_4$ (innards hot pot)".

In this manner, the information processing device 100 does not select the instance "$I_5$ (baseball)" that does not belong to the category "food" but can select the instance "$I_3$ (Italian)" that belongs to the category "food".

Detailed Example 2

Next, a detailed operation of the information processing device 101 according to the second example embodiment will be described. However, as the following detailed description, detailed description of a configuration similar to a configuration of the first example embodiment will be omitted, and a particular configuration of the second example embodiment will be described. Specifically, detailed operations of the pattern labeling unit 204 and the pattern-score recalculation unit 210 will be described.

It is assumed that the pattern-score calculation unit 203 calculates the reliability scores of pattern candidates illustrated in FIG. 10.

Then, it is assumed that the pattern labeling unit 204 provides the positive label to the pattern candidate $P_2$. As a result, the pattern-score recalculation unit 210 raises the reliability score of the pattern candidate $P_2$. In other words, the pattern-score update unit 211 of the pattern-score recalculation unit 210 increases the reliability score of the pattern candidate $P_2$ provided with the positive label. Specifically, in this description, the pattern-score update unit 211 increases the value of the reliability score of the pattern candidate $P_2$ by "0.2".

Figure 15:
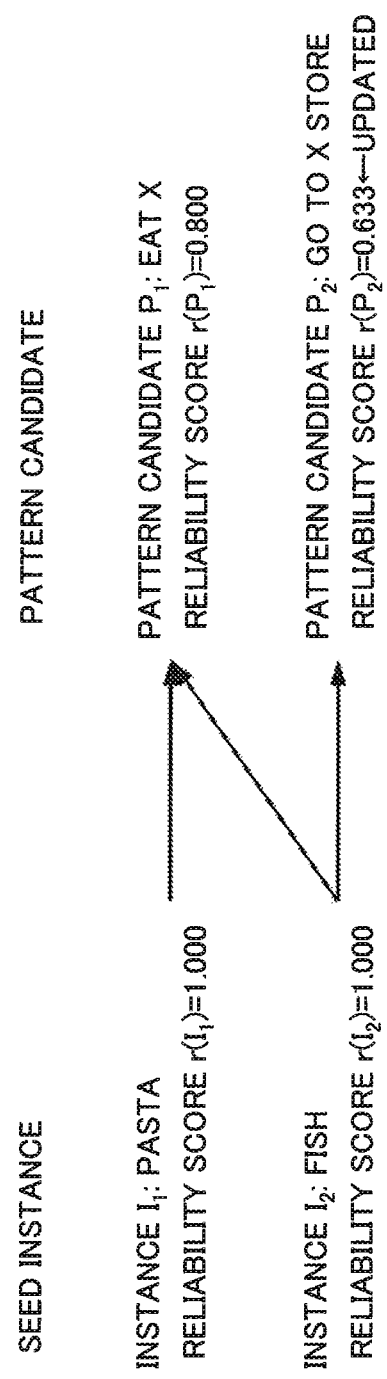
FIG. 15 is a diagram illustrating a pattern candidate in which a reliability score in a second detailed example is updated.

FIG. 15 is a diagram illustrating a pattern candidate $P_2$ in which a reliability score is updated.

The pattern-score back-propagation unit 212 recalculates, based on the updated reliability score of the pattern candidate, the reliability scores of the instances "$I_1$ (pasta)" and "$I_2$ (fish)" by using equation 2. Specifically, the pattern-score back-propagation unit 212 calculates the reliability scores of the instances as described below.

$$r(I_1)=0.800\times1.500/(2.000\times1.500)=0.400$$

$$r(I_2)=(0.800\times0.900+0.633\times1.300)/(2.000\times\\1.500)=0.514$$

Figure 16:
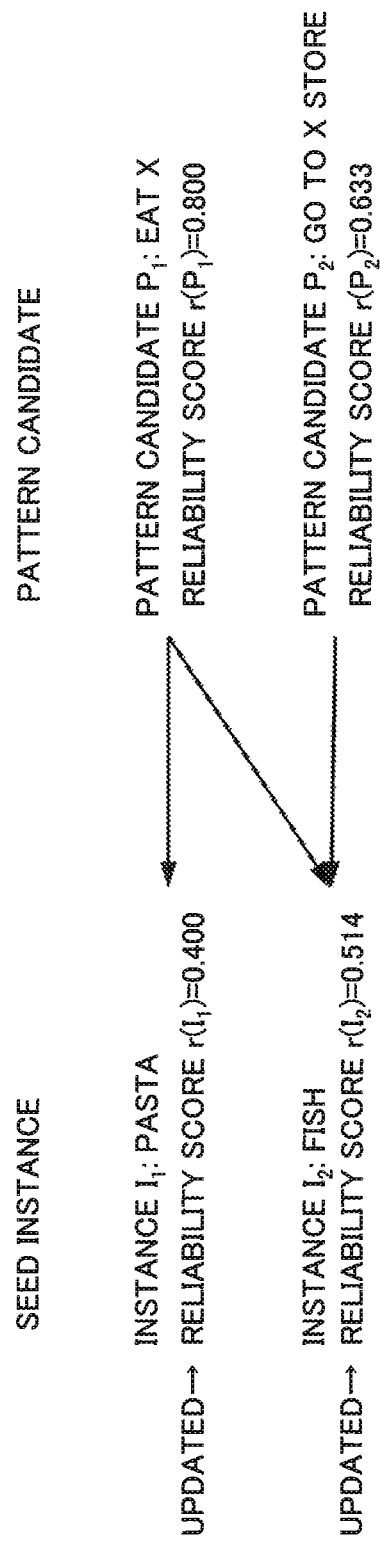
FIG. 16 is a diagram illustrating an updated reliability score of an instance in the second detailed example.

FIG. 16 is a diagram illustrating an updated reliability score of an instance.

Then, the instance-score propagation unit 213 recalculates, based on the updated reliability score of the instance, the reliability score of the pattern candidate by using equation 1. Specifically, the instance-score propagation unit 213 calculates the reliability scores described below.

$$r(P_1)=(0.400\times1.500+0.514\times0.900)/(2.000\times\\1.500)=0.354$$

$$r(P_2)=(0.514\times1.300)/(2.000\times1.500)=0.223$$

Figure 17:
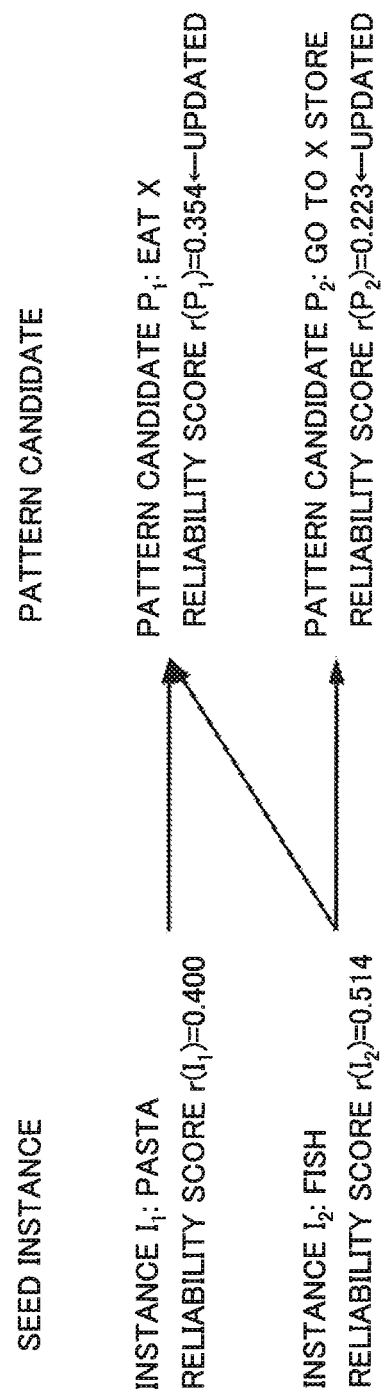
FIG. 17 is a diagram illustrating a recalculated reliability score of a pattern candidate in the second detailed example.
Figure 18:
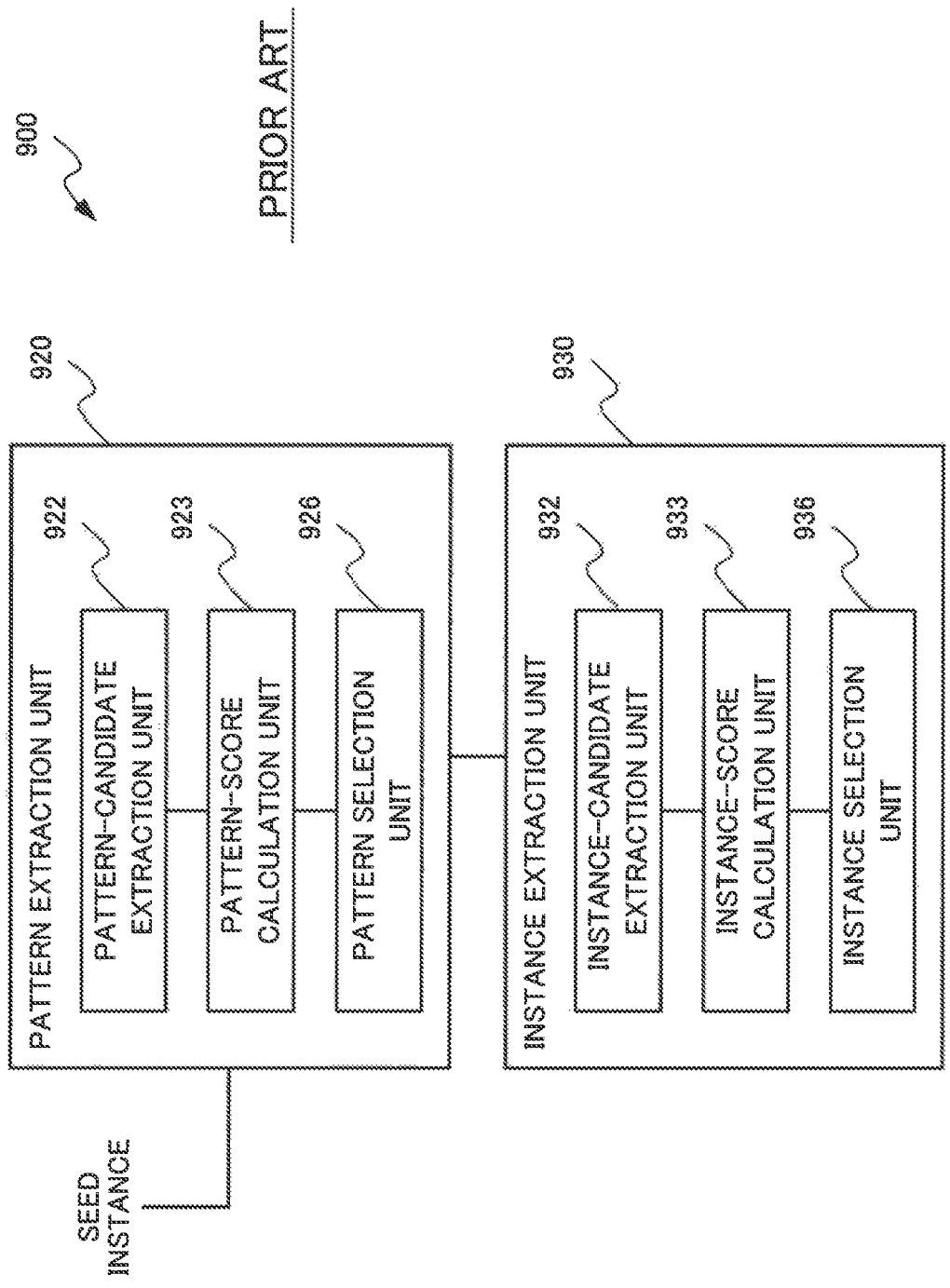
FIG. 18 is a block diagram illustrating one example of a configuration of a common category-knowledge acquisition device.
Figure 19:
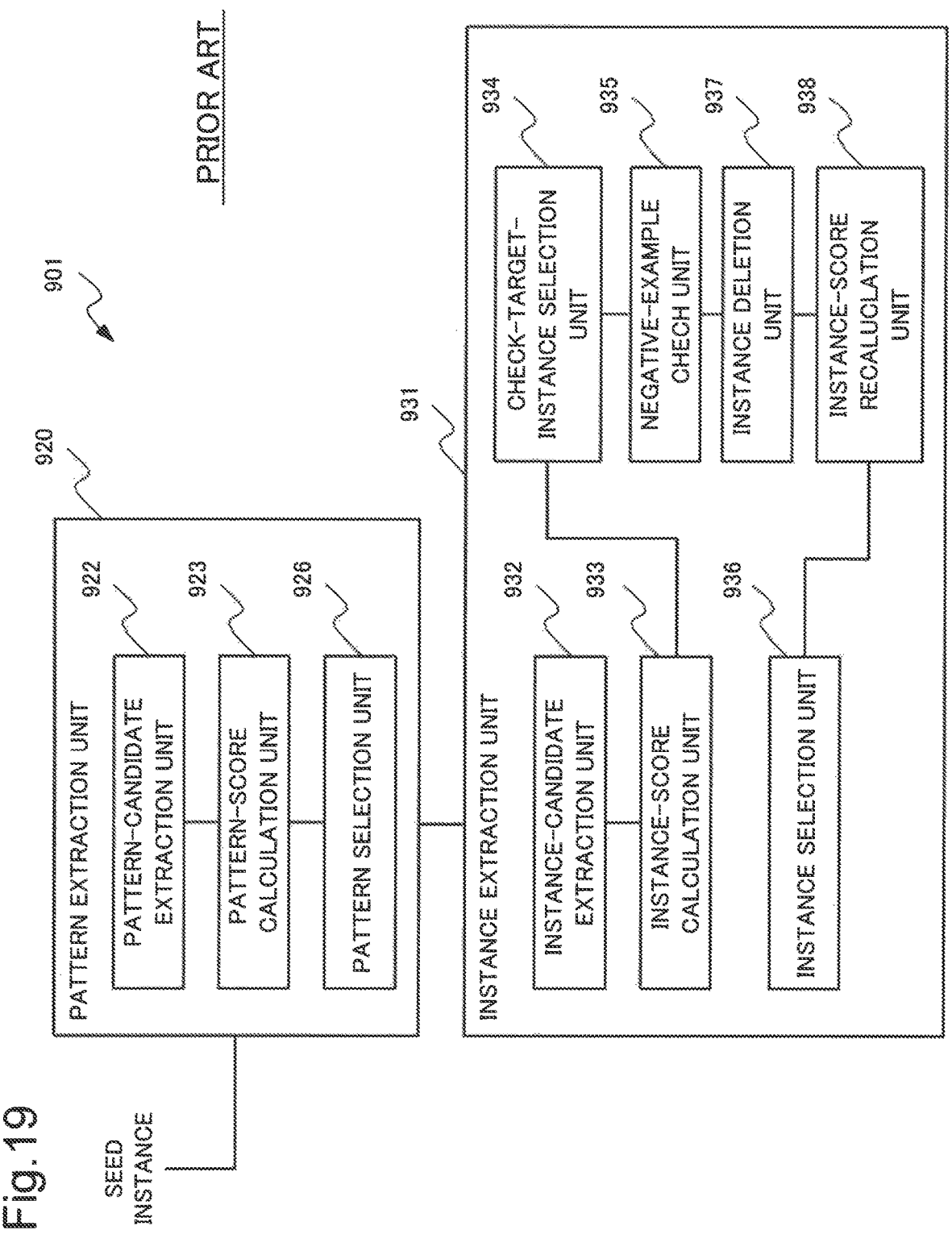
FIG. 19 is a block diagram illustrating one example of a configuration of another common category-knowledge acquisition device.

FIG. 17 is a diagram illustrating a recalculated reliability score of a pattern candidate.

Herein, a ratio of the reliability score of the pattern candidate $P_2$ to a total value of reliability scores will be confirmed.

A ratio (initial ratio) of a reliability score of the pattern candidate $P_2$ illustrated in FIG. 10 is as follows.

An initial ratio=$0.433/(0.800+0.433)=0.351$

On the other hand, a ratio (recalculated ratio) of the reliability score of the pattern candidate $P_2$ after the above-described processing is as follows.

A recalculated ratio=$0.223/(0.354+0.223)=0.386$

In this manner, the information processing device 101 raises the ratio of the pattern candidate $P_2$, based on providing the positive label for the pattern candidate $P_2$.

In this manner, the information processing device 101 improves, based on a label provided for a pattern candidate, a reliability score of the pattern candidate.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2016-025150, filed on Feb. 12, 2016, the disclosure of which is incorporated herein in its entirety by reference.

The whole or part of the exemplary embodiments disclosed above can be described as, but not limited to, the following supplementary notes.

[Supplementary Note 1]

An information processing device includes:

a memory; and at least one processor coupled to the memory, the processor performing operations, the operations including:

providing, based on a first reliability score being a value representing a degree of a relationship between an instance candidate being a candidate for an instance that is data included in a category being a set of predetermined data and a pattern being a characteristic expression in the predetermined data, a first label for at least a part of the instance candidates; and updating the first reliability score of the instance candidate provided with the first label.

[Supplementary Note 2]

The information processing device according to supplementary note 1, wherein the operations further includes:

extracting a pattern candidate relating to the instance, calculating a second reliability score indicating a degree of a relationship of the pattern candidate to the instance, selecting the pattern from the pattern candidate, based on the second reliability score, extracting the instance candidate relating to the selected pattern, calculating the first reliability score in the extracted instance candidate, and selecting the instance from the instance candidate, based on the updated first reliability score.

[Supplementary Note 3]

The information processing device according to supplementary note 2, wherein the operations further includes:

updating the first reliability score of the instance candidate, based on the first label provided for the instance candidate, recalculating the second reliability score of the pattern, based on the updated first reliability score of the instance candidate, and recalculating the first reliability score of the instance candidate, based on the recalculated second reliability score of the pattern.

[Supplementary Note 4]

The information processing device according to supplementary note 2 or 3, wherein the operations further includes:

using the selected instance when extracting the pattern candidate.

[Supplementary Note 5]

The information processing device according to supplementary note 4, wherein the operations are repeated until a predetermined condition is satisfied.

[Supplementary Note 6]

The information processing device according to supplementary note 5, wherein the operations further includes:

deleting the instance candidate, based on the first label provided for the instance candidate.

[Supplementary Note 7]

The information processing device according to any one of supplementary notes 2 to 6, wherein the operations further comprise:

providing a second label indicating whether or not the instance relating to the pattern candidate is included in the category for the pattern candidate provided with the second reliability score, and recalculating the second reliability score of the pattern candidate, based on the second label provided for the pattern candidate.

[Supplementary Note 8]

The information processing device according to supplementary note 7, wherein the operations further includes:

updating the second reliability score of the pattern candidate, based on the second label provided for the pattern candidate, recalculating the first reliability score of the instance relating to the pattern candidate, based on the updated second reliability score of the pattern candidate, and recalculating the second reliability score of the pattern candidate, based on the recalculated first reliability score of the instance.

[Supplementary Note 9]

The information processing device according to supplementary note 8, wherein the operations further includes:

deleting the pattern candidate, based on the second label provided for the pattern candidate.

[Supplementary Note 10]

An information processing method includes:

providing, based on a first reliability score being a value representing a degree of a relationship between an instance candidate being a candidate for an instance that is data included in a category being a set of predetermined data and a pattern being a characteristic expression in the predetermined data, a first label for at least a part of the instance candidates; and updating the first reliability score of the instance candidate provided with the first label.

[Supplementary Note 11]

A non-transitory computer-readably recording medium embodying a program, the program causing a computer to perform a method, the method includes:

providing, based on a first reliability score being a value representing a degree of a relationship between an instance candidate being a candidate for an instance that is data included in a category being a set of predetermined data and a pattern being a characteristic expression in the predetermined data, a first label for at least a part of the instance candidates; and updating the first reliability score of the instance candidate provided with the first label.

INDUSTRIAL APPLICABILITY

The present invention is applicable to an application in knowledge acquisition for acquiring data (knowledge) included in a category from a large-scale corpus.

Further, the present invention is also applicable to an application for acquiring, with respect to a corpus of a specific field, data (knowledge) included in a category unique to the field.

REFERENCE SIGNS LIST

100 Information processing device
101 Information processing device
102 Information processing device 200 Pattern extraction unit
201 Pattern extraction unit
202 Pattern-candidate extraction unit
203 Pattern-score calculation unit
204 Pattern labeling unit
206 Pattern selection unit
210 Pattern-score recalculation unit
211 Pattern-score update unit
212 Pattern-score back-propagation unit
213 Instance-score propagation unit
214 Pattern-negative-example deletion unit
215 Pattern-score recalculation unit
300 Instance extraction unit
302 Instance-candidate extraction unit
303 Instance-score calculation unit
304 Instance labeling unit
306 Instance selection unit
310 Instance-score recalculation unit
311 Instance-score update unit
312 Instance-score back-propagation unit
313 Pattern-score propagation unit
314 Instance-negative-example deletion unit
315 Instance-score recalculation unit
600 Information processing device
610 CPU
620 ROM
630 RAM
640 Internal storage device
650 IOC
660 Input device
670 Display device
680 NIC
700 Storage medium
900 Category-knowledge acquisition device
901 Category-knowledge acquisition device
920 Pattern extraction unit
922 Pattern-candidate extraction unit
923 Pattern-score calculation unit
926 Pattern selection unit
930 Instance extraction unit
931 Instance extraction unit
932 Instance-candidate extraction unit
933 Instance-score calculation unit
934 Check-target-instance selection unit
935 Negative-example check unit
936 Instance selection unit
937 Instance deletion unit
938 Instance-score recalculation unit

What is claimed is:

1. An information processing device comprising:
a memory; and
at least one processor coupled to the memory,
the processor performing operations,
the operations comprising:
providing, based on a first reliability score being a value representing a degree of a relationship between an instance candidate being a candidate for an instance that is data included in a category being a set of predetermined data and a pattern being a characteristic expression in the predetermined data, a first label for at least a part of the instance candidates;
updating the first reliability score of the instance candidate provided with the first label;
extracting a pattern candidate relating to the instance;
calculating a second reliability score indicating a degree of a relationship of the pattern candidate to the instance;
selecting the pattern from the pattern candidate, based on the second reliability score, extracting the instance candidate relating to the selected pattern;
calculating the first reliability score in the extracted instance candidate;
selecting the instance from the instance candidate, based on the updated first reliability score;
updating the first reliability score of the instance candidate, based on the first label provided for the instance candidate;
recalculating the second reliability score of the pattern, based on the updated first reliability score of the instance candidate; and
recalculating the first reliability score of the instance candidate, based on the recalculated second reliability score of the pattern.

2. The information processing device according to claim 1, wherein the operations further comprise:
using the selected instance when extracting the pattern candidate.

3. The information processing device according to claim 2, wherein
the operations are repeated until a predetermined condition is satisfied.

4. The information processing device according to claim 3, wherein the operations further comprise:
deleting the instance candidate, based on the first label provided for the instance candidate.

5. The information processing device according to claim 1, wherein the operations further comprise:
providing a second label indicating whether or not the instance relating to the pattern candidate is included in the category for the pattern candidate provided with the second reliability score, and
recalculating the second reliability score of the pattern candidate, based on the second label provided for the pattern candidate.

6. The information processing device according to claim 5, wherein the operations further comprise:
updating the second reliability score of the pattern candidate, based on the second label provided for the pattern candidate,
recalculating the first reliability score of the instance relating to the pattern candidate, based on the updated second reliability score of the pattern candidate, and
recalculating the second reliability score of the pattern candidate, based on the recalculated first reliability score of the instance.

7. The information processing device according to claim 6, wherein the operations further comprise:
deleting the pattern candidate, based on the second label provided for the pattern candidate.

8. An information processing method comprising:
providing, based on a first reliability score being a value representing a degree of a relationship between an instance candidate being a candidate for an instance that is data included in a category being a set of predetermined data and a pattern being a characteristic expression in the predetermined data, a first label for at least a part of the instance candidates;
updating the first reliability score of the instance candidate provided with the first label;
updating the first reliability score of the instance candidate provided with the first label;
extracting a pattern candidate relating to the instance;

calculating a second reliability score indicating a degree of a relationship of the pattern candidate to the instance;

selecting the pattern from the pattern candidate, based on the second reliability score, extracting the instance candidate relating to the selected pattern;

calculating the first reliability score in the extracted instance candidate;

selecting the instance from the instance candidate, based on the updated first reliability score;

updating the first reliability score of the instance candidate, based on the first label provided for the instance candidate;

recalculating the second reliability score of the pattern, based on the updated first reliability score of the instance candidate; and recalculating the first reliability score of the instance candidate, based on the recalculated second reliability score of the pattern.

9. A non-transitory computer-readably recording medium embodying a program, the program causing a computer to perform a method, the method comprising:

providing, based on a first reliability score being a value representing a degree of a relationship between an instance candidate being a candidate for an instance that is data included in a category being a set of predetermined data and a pattern being a characteristic expression in the predetermined data, a first label for at least a part of the instance candidates;

updating the first reliability score of the instance candidate provided with the first label;

updating the first reliability score of the instance candidate provided with the first label;

extracting a pattern candidate relating to the instance;

calculating a second reliability score indicating a degree of a relationship of the pattern candidate to the instance;

selecting the pattern from the pattern candidate, based on the second reliability score, extracting the instance candidate relating to the selected pattern;

calculating the first reliability score in the extracted instance candidate;

selecting the instance from the instance candidate, based on the updated first reliability score;

updating the first reliability score of the instance candidate, based on the first label provided for the instance candidate;

recalculating the second reliability score of the pattern, based on the updated first reliability score of the instance candidate; and recalculating the first reliability score of the instance candidate, based on the recalculated second reliability score of the pattern.

* * * * *